(12) United States Patent
Buschulte

(10) Patent No.: US 10,427,248 B2
(45) Date of Patent: Oct. 1, 2019

(54) CARDBOARD-HANDLING SYSTEM AND METHOD

(71) Applicant: HIGHCON SYSTEMS LTD., Yavne (IL)

(72) Inventor: Rainer Buschulte, Beuren (DE)

(73) Assignee: HIGHCON SYSTEMS LTD., Yavne (IL)

( * ) Notice: Subject to any disclaimer, the term of this patent is extended or adjusted under 35 U.S.C. 154(b) by 462 days.

(21) Appl. No.: 15/155,017

(22) Filed: May 15, 2016

(65) Prior Publication Data

US 2016/0332261 A1 Nov. 17, 2016

Related U.S. Application Data

(63) Continuation of application No. 13/684,196, filed on Nov. 22, 2012, now Pat. No. 9,346,129.

(60) Provisional application No. 61/596,379, filed on Feb. 8, 2012, provisional application No. 61/563,120, filed on Nov. 23, 2011.

(51) Int. Cl.
*B23K 26/38* (2014.01)
*B23K 103/00* (2006.01)
*B31B 50/20* (2017.01)
*B31B 50/14* (2017.01)

(52) U.S. Cl.
CPC .......... *B23K 26/38* (2013.01); *B23K 2103/40* (2018.08); *B23K 2103/50* (2018.08); *B31B 50/144* (2017.08); *B31B 50/20* (2017.08)

(58) Field of Classification Search
CPC .. B23K 26/38; B23K 26/402; B23K 2203/40; B26D 5/20; B26D 7/025

USPC ............. 219/121.67, 121.72, 121.82; 266/65
See application file for complete search history.

(56) References Cited

U.S. PATENT DOCUMENTS

| | | | | |
|---|---|---|---|---|
| 3,226,527 A | * | 12/1965 | Harding | B23K 26/0846 219/384 |
| 3,828,159 A | * | 8/1974 | Zoot | B23K 26/702 108/161 |
| 3,846,871 A | * | 11/1974 | Kolbach | A61F 13/15626 19/148 |
| 4,117,799 A | * | 10/1978 | Koula | A41H 42/00 101/35 |
| 4,637,206 A | | 1/1987 | Suwa | |
| 4,675,497 A | | 6/1987 | Pearl et al. | |
| 5,201,258 A | * | 4/1993 | Cremona | B23D 47/025 144/245.1 |
| 5,316,282 A | * | 5/1994 | Fukube | B65H 3/18 271/10.07 |

(Continued)

FOREIGN PATENT DOCUMENTS

| | | |
|---|---|---|
| JP | 1985081346 A | 5/1985 |
| JP | 1-109390 U | 7/1989 |

(Continued)

OTHER PUBLICATIONS

JP 1985081346 Machine translation from web site https://www4.j-platpat.inpit.go.jp/eng/tokujitsu/tkbs_en/TKBS_EN_GM101_SearchResult.action.

(Continued)

*Primary Examiner* — Thien S Tran
(74) *Attorney, Agent, or Firm* — Daniel Feigelson; Fourth Dimension IP

(57) ABSTRACT

There is provided a system for handling and creasing cardboard, as well as sub-systems of said system. Other embodiments are also disclosed.

20 Claims, 12 Drawing Sheets

(56) References Cited

U.S. PATENT DOCUMENTS

| | | | | |
|---|---|---|---|---|
| 5,436,423 | A | * | 7/1995 | Welty .................... B26F 1/3813 219/121.39 |
| 5,740,055 | A | * | 4/1998 | Iwata ..................... D05B 19/08 112/475.19 |
| 6,191,382 | B1 | * | 2/2001 | Damikolas ............. B23K 26/04 219/121.62 |
| 2005/0116396 | A1 | * | 6/2005 | LeMasson ......... B23K 37/0461 266/65 |
| 2007/0199648 | A1 | * | 8/2007 | Hulverscheidt, Jr. ....................... B26F 1/3813 156/252 |
| 2010/0132526 | A1 | * | 6/2010 | Wahl ................. B23K 26/0876 83/152 |

FOREIGN PATENT DOCUMENTS

| | | |
|---|---|---|
| JP | 1993104365 A | 4/1993 |
| JP | 1994226482 A | 8/1994 |
| JP | 1996040594 A | 2/1996 |
| JP | 1999168166 A | 6/1999 |
| JP | 2002059288 A | 2/2002 |
| JP | 2002239774 A | 8/2002 |
| JP | 2005118997 A | 5/2005 |
| JP | 2006212640 A | 8/2006 |
| JP | 2001259878 A | 9/2009 |
| JP | 2011011226 A | 1/2011 |

OTHER PUBLICATIONS

JP 2002059288 Machine Translation (by EPO and Google)—published Feb. 26, 2002; Anayama Create:KK Yamazaki Hisao.
JP 1994226482 Machine Translation (by EPO and Google)—published Aug. 16, 1994; Itami Kogyo KK.
JP 2001259878 Machine Translation (by EPO and Google)—published Sep. 25, 2009; Hitachi Ltd.
JP 2002239774 Machine Translation (by EPO and Google)—published Aug. 28, 2002; Hitachi Metals Ltd.
JP 2005118997 Machine Translation (by EPO and Google)—published May 12, 2005; National Institute of Advanced Industrial & Technology.
JP 1999168166 Machine Translation (by EPO and Google)—published Jun. 22, 1999; Kobe Steel Ltd Genesis Technology KK.

* cited by examiner

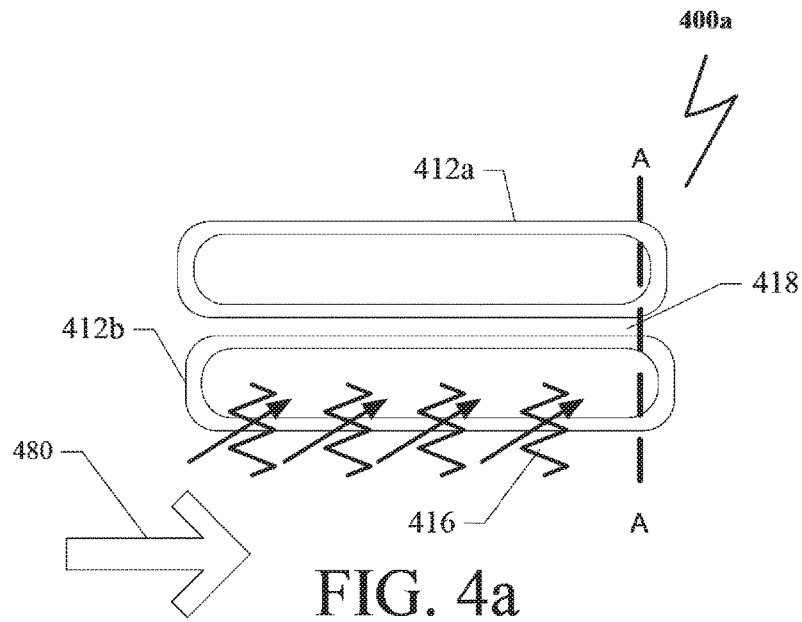
FIG. 4a
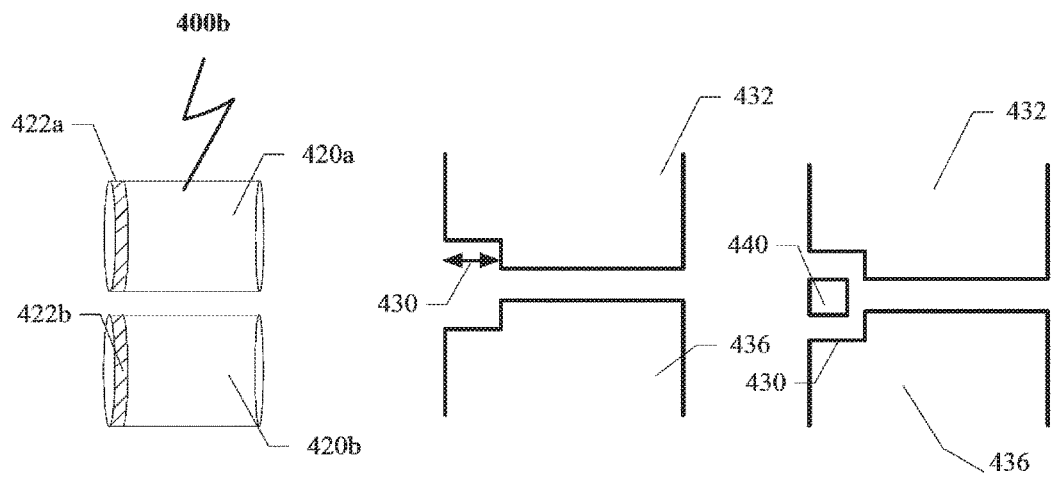
FIG. 4b
A-A section View
FIG. 4c
FIG. 4d

CARDBOARD-HANDLING SYSTEM AND METHOD

CROSS-REFERENCE TO RELATED APPLICATIONS

This application is a continuation of application Ser. No. 13/684,196, filed Nov. 22, 2012, which claims the benefit of provisional Application Ser. No. 61/596,379, filed Feb. 8, 2012, the benefit of provisional Application Ser. No. 61/563,120, filed Nov. 23, 2011. The benefit of all of the aforesaid applications is claimed, and their contents are incorporated herein by reference in their entirety.

TECHNICAL FIELD

The present disclosure generally relates to die-cutting and die-creasing industry, and more particularly the disclosure relates to a system and method of conveying and/or situating cardboard.

BACKGROUND ART

The rapid evolution of trade around the world creates a significant demand for packaging in order to transfer/distribute goods to different remote areas. The transport of goods may be done by: ship, airplanes, trucks, and so on. The transport of goods may be performed by: the manufacturer; different suppliers; individual persons; etc. Further, a significant demand for different brochures, flyers, etc. also takes part in trade. The different brochures/flyers may have pre-folds and/or embossing, for example. Embossing such as, but not limited to Braille writing.

Packaging takes a major role in the marketing today. The package in which the goods are packed and presented, in a store for example, may determine if the goods will be appealing to a potential buyer in the store or not. Thus the packaging appearance can have a direct effect on the sales of merchandise. The brochures, flyers, and so on may also contribute to the sales and/or awareness to a product and/or a service etc.

Henceforth, throughout the description, drawings and claims of the present disclosure, the terms package, paperboard box, parcel, box, carton box, cardboard box, brochure, flyers, plastic box, etc. may be used interchangeably. The present disclosure may use the term package as a representative term for the above group as well as variant thereof.

A known preliminary requirement, in order to construct a package, is preparing or purchasing a pre-treated cardboard and/or plastic and/or paper based material. Paper based material may be of different types. Exemplary types may be: waxed paper, cartridge paper, art paper, etc. Henceforth, throughout the description, drawings and claims of the present disclosure, the terms cardboard, card-stock, display board, corrugated fiberboard, paperboards of different paper based material, folding boxboard, carton, blanks, blister cards, plastics, boards/papers with enhancement (UV coating, printing, for example) and lamination, and so on, may be used interchangeably. The present disclosure may use the term cardboard as a representative term for the above group as well as variant thereof.

The pre-treatment of a cardboard may include the following acts: creating folding lines along the cardboard to ease and provide accurate folding of the cardboard; piercing the cardboard in different areas; creating embossment in different areas of the cardboard; cutting the raw cardboard into predefined profiles; and so on. Henceforth, the description, drawings and claims of the present disclosure the terms pre-folded cardboard, and pre-treated cardboard may be used interchangeably. The present disclosure may use the term pre-treated cardboard as a representative term for the above group as well as variant thereof.

Some common techniques for preparing a pre-treated cardboard include the acts of placing the cardboard between dies. Exemplary types of dies can be: a cutting-die; a creasing-die; an embossing-die; a scoring-die; a combination of the different types of dies; and so on. Known dies include a rule-die and a counter-die. Other known techniques for preparing pre-treated cardboard may include the use of laser. Henceforth, the description, drawings and claims of the present disclosure may use the term die-creasing industry as a representative term for creasing-die; cutting-die embossing-die; scoring-die; laser; a combination of them, as well as variant thereof and so on.

SUMMARY OF DISCLOSURE

In order to form a pre-treated cardboard into a package with required properties, the pretreated cardboard should have a plurality of creases and/or cuts and/or embossing at planned areas along the cardboard. Exemplary properties of the package may be: length, width, height, shape, etc. Exemplary results that may occur if the creasing and or cutting are not at the planned areas, of the pre-treated cardboard, may cause the cardboard to fold into an unwanted shaped package, for example.

Also, cardboards with a printed side should have the creases and/or cuts and/or embossing at the planned areas along the cardboard. Exemplary results that may occur if the creasing and or cutting are not at the planned areas, of the pre-treated cardboard, may cause the printed image to be cut or folded at the wrong areas of the printed image.

In the die-crease industry the position of the cardboard to be pre-treated in relation to the dies and/or laser should be substantially accurate. We have found that when dealing in an industry in which the job description is dynamic and the cardboard thickness and/or width and/or length and/or material type and/or printed image may change from one job to another, there are some challenges when working with an automatic machine and/or when the user is not a person skilled in the art (specialist, technician, etc.). Furthermore the demand for short run customized package increases.

Further, when laser beam is used for pretreating cardboards, burn marks may be formed on the cardboard itself. This may damage the esthetics of the cardboard. Further the laser beam may damage the system itself in the long run.

Some pretreated cardboard should be handled with care when stacked, in order to avoid different damages. Exemplary damages could be: unwanted rips along the cardboard unwanted folding, and so on.

The above-described deficiencies in common die-crease industries do not intend to limit the scope of the inventive concepts in any manner. They are merely presented for illustrating an existing situation.

Among other things, the present disclosure provides a novel cardboard-handling system and method for handling cardboard in the die-crease industry. In an exemplary embodiment the novel cardboard-handling system may comprise one or more cardboard-alignmentor. An exemplary cardboard-alignmentor may align the cardboard to a required position in relation to the cardboard-handling system. In some embodiments one or more cardboard-alignmentor may be placed at different locations along the cardboard-handling system. In an exemplary embodiment a cardboard-alignmentor may be located near the beginning of the cardboard-handling system.

An exemplary embodiment of a cardboard-alignmentor may align a cardboard in a direction substantially similar to a machine's running direction (direction through which the cardboards are required to flow through the system, for example); in some exemplary embodiments the cardboard-alignmentor may align the cardboard in a cross direction (direction that is substantially perpendicular to the machine's running direction); in yet other exemplary embodiments the cardboard-alignmentor may align the cardboard in a diagonal-like direction in relation to the machine's running direction. Other exemplary embodiments of cardboard-alignmentor may be a combination of the above exemplary embodiments, and so on.

An exemplary cardboard-alignmentor may align the cardboard to the required position while conveying it toward the next module of the cardboard-handling system. Advantageously, enabling the system to continue its flow while alimenting occurs. In other embodiments the alignment may be done while stopping the system throughput, for example.

An exemplary embodiment of a cardboard-alignmentor may comprise one or more alignment bars, and one or more alignment conveyers. An exemplary alignment bar may be placed substantially parallel to the machine's running direction. An exemplary aligning bar may include: a rail and/or a side-wall substantially parallel to the machine's running direction, for example. An exemplary alignment conveyor may comprise: a belt in a diagonal-like direction in relation to the machine's running direction. The conveyor belt may be a combination of a pierced belt and a vacuum mechanism underneath it, for example. The vacuum may couple the cardboard to the pierced belt; the pierced belt may move in diagonal direction, in relation to the machine's running direction, toward the aligning bar; and the cardboard may be aligned along the aligning bar, for example. The vacuums level may be adjust during and/or before the alignment, the vacuum level may be different along the belt. Thus the coupling force differs along the belt. More information is disclosed in conjunction with FIG. 3.

In some exemplary embodiments the cardboard-handling system may comprise a plurality of synchronized-cardboard transferors along a path that the cardboard may pass through. The synchronized-cardboard transferors may comprise a plurality of cardboard transferors. The cardboard transferors may be synchronized with the cardboard-handling system. In some exemplary embodiments the synchronization may be implemented by a controller and one or more: sensors, and/or detectors, and/or measurement devices along the path of the cardboard.

An exemplary controller may comprise one or more servo drivers, for example. The controller may use one or more parameters of the cardboard to determine certain tasks. The controller may get the one or more parameters of the cardboard from an operator and/or by one or more measurement modules along the cardboard handlying system, for example. Exemplary parameters may be length of the cardboard, the weight of the cardboard, the friction parameters of the surface (top and/or bottom) of the cardboard, etc.

In some exemplary embodiments the synchronization may be implemented by one or more timing belt. Yet in some exemplary embodiments may be a combination of the above, and so on. The synchronization may be between different modules. Exemplary modules may be: between the two or more cardboard transferors, between at least one of the cardboard transferors and one or more other modules of the cardboard-handling system, a combination of the above, and so on.

An exemplary cardboard transferor may get a cardboard and transfer it toward the next module of the cardboard-handling system. Along the next module there may be another cardboard transferor that may be synchronized to get the cardboard at a certain time and/or area and to transfer it further, and so on. The synchronization may be achieved in different ways. Exemplary way may be: using a controller, using one or more detectors, one or more feedback mechanism, a combination of the above, and so on. More information is disclosed in conjunction with FIG. 8.

In an exemplary embodiment a cardboard transferor may comprise: one or more cardboard leading mechanism and one or more transferor. An exemplary embodiment of a cardboard leading mechanism may be one or more pinch rollers. An exemplary embodiment of transferor may be one or more nip rollers. A nip roller may be a rotatable cylinder. A pinch roller may be a rotatable disc. A cardboard may be placed on top of the nip roller and beneath the pinch roller, for example. The Cardboard may be coupled to the nip roller by pressure impressed by the pinch roller, for example.

The pressure of the pinch roller may be adjusted according to the cardboard parameters, for example. Adjusting may be done mechanically, automatically, manually, and/or a combination of them. Thus when the nip roller will rotate around it's center, the friction and the force due to the pressure will create a rotation of the pinch roller around its center, together with the pressure imposed on the cardboard the cardboard may move through the pinch roller and nip roller in a direction substantially similar to the nip roller rotating direction.

Further the placement of the pinch roller in relation to the nip roller may create a diversion to the cardboard's movement transferred by the nip rollers, for example. An exemplary diversion of the cardboard's movement may be toward an alignment bar. In some exemplary embodiments the cardboard transferor may be part of a cardboard alignment mechanism. More information is disclosed in conjunction with FIG. 3.

The synchronization between the one or more cardboard transferor along the cardboard-handling system may be implemented in different ways. Exemplary ways may comprise: using the same engine to rotate two or more nip rollers placed in different areas along the system, using a timing belt, etc. In some exemplary embodiments the synchronization may comprise detecting and/or measuring a shift in the cardboards direction from the wanted and/or pre-calculated direction, detecting and/or measuring a shift in the cardboards velocity from the wanted and/or pre-calculated velocity, and so on. The detection may be according to parameters of the cardboard (edge, for example) and/or detection of an image and/or mark on the cardboard surface, for example. Accordingly the synchronization mechanism may alter the rotation and or velocity of the one or more cardboard transporter, and/or the velocity of other modules along the cardboard-handling system, etc.

The detecting and/or measuring of cardboards direction and/or velocity may be implemented in different ways. Exemplary ways may be: by getting the length of the cardboard; getting inputs from one or more detectors and/or sensors along the path on the placement of the cardboard; using inputs of the dimensions of the cardboard-handling system and calculating accordingly. The inputs on the length of the cardboard may be input by an operator and/or measured by the cardboard-handling system. Exemplary method and system for measuring the cardboard length may be by detecting when the leading edge of the cardboard has passed a sensor detecting when the other edge (trail edge) of the cardboard passes the sensor, receiving inputs on the velocity of the cardboard and accordingly calculating the length of the cardboard. More information is disclosed in conjunction with FIGS. 3 and/or 8.

Exemplary cardboard-handling system may further comprise one or more cardboard-fix-relative-position conveyors. An exemplary cardboard-fix-relative-position conveyor may convey a cardboard through one or more modules of the cardboard-handling system, while carrying the cardboard in a fix position in relation to the cross and/or main direction of the cardboard-handling system, for example. A cardboard-fix-relative-position conveyor may begin substantially near the termination of a cardboard alignment mechanism, for example.

Exemplary embodiments of a cardboard-fix-relative-position conveyors may be a side gripper, for example. An exemplary side gripper may grip one side of the cardboard, advantageously the cardboards may be in different width, without the need to adjust the cardboard-fix-relative-position conveyors to each cardboard width. Some side grippers may have a self-adapted gripping space, for example. Advantageously the cardboards may be in different thickness, without the need to adjust the cardboard-fix-relative-position conveyors to each cardboard width. The side gripper may convey a cardboard through one or more modules of the cardboard-handling system. Thus the side-gripper may convey a cardboard before being pre-treated, while being pre-treated and after being pre-treated.

An exemplary embodiment of a side gripper with a self-adapted gripping space may comprise two belts: an upper belt and a lower belt, for example. One of the belts may be in a fixed height, while the other belt may have a dynamic height. An exemplary embodiment of a dynamic-height belt may comprise a spring load, for example, coupled to the dynamic-height belt. The spring load may push the dynamic-height belt toward the other belt, and thus cardboards with different thickness may be fixed between the two belts, automatically. Other exemplary embodiments of a dynamic-height belt may comprise a springs pneumatic cylinders; and/or pneumatic pressure; and/or fluid pressure etc. In other embodiment both belts may have a dynamic height, and so on. Load in between the side gripper belts may vary according to different material properties and/or characteristics of the cardboard, for example. Furthermore in some exemplary embodiments the load may also vary according to different production parameters. Parameters such as, but not limited to: speed and/or die patterns, etc.

In some exemplary embodiments the spring load may be held back, thus creating a wide gap between the two belts, until it is detected that a cardboard is entering the side gripper and then the spring load may be released to create the required pressure and adapted gap between the two belts. In other exemplary embodiments the spring load may be supple enough that a cardboard entering the side gripper may push the belts further from each other in contrast to the spring load, to a point that the gap between the belts matches the cardboard width, and so on. Other embodiments may comprise a different mechanism than the spring load. Other exemplary embodiments may comprise: rollers and/or chain systems, and so on. More information is disclosed in conjunction to FIG. 4*a-c*.

Some exemplary cardboard-fix-relative-position conveyors may comprise a cross-limit-guarder. An exemplary cross-limit-guarder may guard that the cardboard will not move in the cross direction more than a predefined limit from a desirable position. Exemplary predefined limit may be a few millimeters (5-15 mm, for example). An exemplary embodiment of a cross-limit-guarder, when using the two belts described above, may be by using belts with a step-like shape along their cross direction. The length of the step-like shape may be substantially similar to the length of the predefined limit, for example. Other embodiments may use a bar along the belts, and so on.

Some exemplary embodiment of a cross-limit-guarder may further be used to avoid wear and tear effects. The cardboard may be gripped by the side gripper close to the cardboard's edge but not the exactly the cardboard's edge itself. Thus the sharp cardboard edge may be free. More information is disclosed in conjunction to FIG. 4*a-c*.

The cardboard-fix-relative-position conveyors such as, but not limited to the side gripper may have a synchronization mechanism between one or more modules of the cardboard-handling system. The synchronization may adapt the velocity and/or position of the cardboard-fix-relative-position conveyors according to relevant module requirements, for example. Exemplary synchronization mechanism may comprise: detectors, feedbacks, controller, etc. More information is disclosed in conjunction to FIG. 8*a-c*.

An exemplary embodiment of a cardboard-handling system may further comprise an under-laser raiser. An exemplary under-laser raiser may stable the cardboard in a fix position, in at least one axis, while the laser beam is working on the cardboard. An exemplary under-laser raiser may prevent burn marks (from smoke, and/or reflections of the laser's beam, for example) on the cardboard. Furthermore an exemplary under-laser raiser may protect the substrate and/or area underneath the cardboard from the heat of the laser beam. Some exemplary under-laser raiser may also convey the cardboard.

An exemplary embodiment of an under-laser raiser may comprise a plurality of protruding elements, substantially parallel one to the other. The plurality of protruding elements may be protruded from a base. Exemplary protruding elements may have a needle-like shape, for example. Exemplary base may be: polymer based material; metal based material; plastic meshes based material; ceramics, and so on. A cardboard may be placed in a substantially horizontal position on the top of the protruding elements. Other exemplary embodiments of under-laser raiser may be: chains, ropes; and so on.

A coupling and stabling mechanism may be used to couple and stable the cardboard to the top of the protruding elements. Exemplary coupling and stabling mechanism may comprise a plurality of gaps (openings) in the base and a suction mechanism may be used. The gaps may be holes for examples. In other embodiments the base may be a plurality of straps with gaps between them, and so on. Suction mechanism such as, but not limited to a vacuum generator, for example. The suction mechanism may couple and stable the cardboard to the top of the protruding elements. Other exemplary embodiments for coupling and stabling a cardboard to a substrate and/or top of the protruding elements may be by imposing air from above the cardboard and perpendicular to the cardboard's surface, for example. Other exemplary embodiments may be a combination of the above, and so on.

The vacuum may couple the cardboard, blanks, and/or other cut parts (of the cardboard, for example) in required position on the under-laser raiser. This may be advantageously when the cardboard has been pretreated and parts of it are cut/and/or creased and thus may be free from the side gripper, for example. The vacuum may also evacuate the smoke caused by treatment of the cardboard by the laser beam, and advantageously prevent burn marks on the pre-treated cardboard, for example.

Some exemplary embodiments of a suction mechanism may further comprise a dynamic-shape shutter. An exemplary embodiment of a dynamic-shape shutter may comprise a plurality of shafts linked together as a blanket and wrapped around a pivot. When the pivot rotates it may broaden and/or contract the blanket of shafts (depending on the direction of the rotation). The dynamic-shape shutter may be located between the suction mechanism and the base with its openings (gaps), for example. An exemplary dynamic-shape shutter may cover some of the base's opening (gaps) according to the width of the cardboard, for example. Advantageously the adaption of the suction area to a cardboard size may create an adapted air flow for smoke evacuation as well as adapted grip of cardboard and/or waste parts from the pre-treated cardboard, for example. In some exemplary embodiments there may be a plurality of dynamic-shape shutter. The plurality of dynamic-shape shutter shape may be placed substantially parallel to each other. In other embodiments the plurality of dynamic-shape shutter may be placed substantially perpendicular one to the other, and so on.

In exemplary embodiments in which the under-laser raiser acts as a conveyor of the cardboard as well, the base of the under-laser raiser may be a belt and/or associated to a belt, for example. A synchronization may be implemented between the under-laser raiser and one or more modules of the cardboard-handling system, for example. For example synchronization may be implemented between the side gripper and the under-laser raiser.

The synchronization may be implemented by using a timing belt, for example. The side griper system and the under-laser raiser belt may have the same timing-belt's pitch between teeth and may both be driven by the same shaft, for example. They may both have similar pulley dimensions, etc. Advantageously both the under-laser raiser and the side griper system may be mechanically synchronized and have similar system stiffness and response performance to production situation. Exemplary pitch between teeth of a timing belt can be around a few mm (10 mm, for example). Advantageously the timing belt may prevent scratches on the cardboard from the protruding elements and the movement. In some exemplary embodiment there may be one or more under-laser raiser in parallel one to the other. Another exemplary embodiment under-laser raiser may be a blanked of linked wheels. In some exemplary embodiment the synchronization between the under-laser raiser and another module of the cardboard-handling system may be via a controller, and/or detectors sensors feedback, while each module has an independent direct drive, and so on.

In exemplary embodiments the height of the protruding elements may be designed such that the focal point of the laser beam will not strike the base of the under-laser raiser thus protecting the base from the maximum heat of the laser beam. The top of the protruding elements may be designed to have a small surface such that if and/or when the laser beam hits the protruding element it will hit only a small area. The length (height) of the protruding elements may also be designed such that if and/or when a laser beam strikes a protruding element the heat will cool along the length of the protruding element before reaching the base.

The length of the protruding element may also be designed to enable airflow in the gap between the cardboard and the base to create air velocity gradient advantageously creating Bernoulli effect accordingly. The airflow may further cool the protruding elements. Further, in some exemplary embodiments the material of the protruding element may be resistance to heat. The shape of the protruding elements may be Diamond-like cross shape, narrower at the top end and at the base end in relation to the middle part of it, for example, and so on.

In some exemplary embodiments the material of the protruding element may be such that light will not reflect from it. In other exemplary embodiments part of the protruding element may be coated with anti-reflect coating. The material of the base of the under-laser raiser may be coated with an anti-reflecting coating and/or comprise light absorbing attributes. In some exemplary embodiments the top surface of the protruding elements may be coated with a coating that influences the friction. More information is disclosed in conjunction with FIG. 5

The cardboard-handling system may further comprise a supportive stacker, for example. An exemplary supportive stacker may transfer the pre-treated cardboard, while supporting the cardboard in a substantially flat situation, for example, over to a stack of pre-treated cardboards. The supportive stacker may release the pre-treated cardboard at the pre-treated cardboard's required final position. An exemplary embodiment of a supportive stacker may comprise a dynamic-size holder that may grip the pre-treated cardboard, from the pre-treated cardboard top surface.

In some exemplary embodiments the dynamic-size holder may grip the pre-treated cardboard from its leading edge all through till its other edge (trail edge). In other exemplary embodiments the dynamic-size holder may grip the pre-treated cardboard from the pretreated cardboard's top edge only. The dynamic-size holder may transfer the pre-treated cardboard over the stack of pre-treated cardboard and release it at the pre-treated cardboard's final position. The release may be gradual or in one stroke.

An exemplary embodiment of a supportive stacker may comprise an adjusted-vacuum chamber that may generate vacuum. An exemplary adjusted-vacuum chamber may be adjusted according to the cardboard's length and/or width. The length of the cardboard may be measured, and/or detected, and/or calculated, and/or inserted by a user to the cardboard-handling system and/or to the supportive stacker itself.

An exemplary embodiment of an adjusted-vacuum chamber may further comprise: a plurality of opening and a piston mechanism, for example. In an exemplary embodiment the piston mechanism may comprise a moving cylinder that may move inside the adjusted-vacuum chamber and reveal a required area of openings along the adjusted-vacuum chamber. The required area of openings may be according to the pre-treated cardboard's length, for example.

The movement of the piston may be in a direction substantially similar to the running direction of the machine, for example. In some exemplary embodiments the area of the openings along the adjusted-vacuum chamber may be adjusted in the cross direction. In other embodiments a combination of them may be implemented. In some exemplary embodiments a dynamic-shape shutter may be used to reveal the required area of openings along the adjusted-vacuum chamber. In yet other embodiments a combination of the above may be used.

In some embodiments the supportive stacker may further comprise a vacuum belt, for example. The vacuum belt may be a belt with a plurality of openings that may lead the pre-treated cardboard along the revealed openings along the adjusted-vacuum chamber. In other exemplary embodiments of the supportive stacker mechanical grippers may grip the leading edge of the pretreated cardboard, etc.

The supportive stacker may be synchronized with one or more modules of the cardboard-handling system. One exemplary embodiment of synchronization may be by a timing belt associated to the vacuum belt and to the side gripper for example. Other exemplary synchronizing mechanism may be by applying one or more servo drivers and electronic synchronization. More information is disclosed in conjunction with FIG. 6.

In some exemplary embodiments the pre-treated cardboard may be released at its final position. The release may be implemented in different ways. Exemplary ways may be: by stopping the vacuum; when the holes (openings) in the vacuum belt at the leading edge of the cardboard pass the piston mechanism which may limit the vacuum area; etc. In some exemplary embodiments the piston mechanism may be adjusted according to the cardboard size. In such embodiments short-length cardboards may be released earlier than longer-length cardboards. Thus the trailing edge of the cardboards may have similar position on the stack for different cardboard dimension, for example. More information is disclosed in conjunction with FIG. 6.

Exemplary cardboard-handling system may further comprise one or more creasing-dies. Exemplary creasing-dies may be flat dies; other exemplary creasing-dies may be dies implemented on drums; And so on. An exemplary embodiment of creasing-dies that may be part of the cardboard handling system may be surface-adhesive-rule technology (SART) dies. More information on the surface-adhesive-rule technology (SART) and the surface-adhesive rules (SAR) flexible material, may be found in related United States applications bearing the title of "Flexible material for surface adhesive rule" having Ser. No. 13/108,312; United States non-provisional application bearing the title of "Method and system for surface adhesive rule technology" having Ser. No. 13/108,389; United States application bearing the title of "Method and system for creating co-layer surface adhesive rule" having Ser. No. 13/108,450; United States application bearing the title of "Method and system for creating surface adhesive rule counter die" having Ser. No. 13/108,526; and "Method and system for surface adhesive rule technology" assigned the Ser. No. PCT/IL 2011/000389. The above applications are incorporated herein by reference in their entirety.

Exemplary embodiments of a cardboard-handling system may further comprise one or more synchronizing mechanisms. Some exemplary embodiments of a synchronizing mechanism may comprise a plurality of synchronizing modules. Each synchronizing module may synchronize two or more modules of the cardboard-handling system, for example. The synchronizing mechanisms may further comprise one or more controllers. An exemplary controller may get information from different sources and accordingly synchronize the synchronizing modules. Exemplary sources of information may be encoders, detectors, sensors, etc. In other exemplary embodiments one or more of the synchronizing modules may synchronize one or more of the other synchronizing modules. The synchronization may be done according to inputs from different sources. Sources such as, but not limited to: encoders, detectors, sensors, etc. Yet other exemplary embodiments may be a combination of the above, and so on.

Some exemplary embodiments of the synchronizing modules may comprise: timing belts, belts with similar pitch teeth, belts driven by the same shaft, modules having driven by the same engine, software or hardware driven modules controlled by one or more synchronizing modules and/or controllers, etc. Some exemplary embodiments may apply servo motors that one or more modules may be mechanically independently driven and synchronized by electronic controllers. Other exemplary embodiments may be a combination of the above.

The synchronization may be according to different parameters. Exemplary parameters may be: time, position of cardboard, velocity of cardboard, position of creasing-dies, inputs from sources such as but not limited to sensors, and a combination of them. The synchronization may comprise: activating and/or stopping operation of one or more modules of the cardboard-handling system, changing the direction of one or more modules of the cardboard-handling system, accelerating or decelerating the operation of one or more modules of the cardboard-handling system; etc.

The synchronization may further comprise signaling different indications. Indications such as, but not limited to: detected malfunction, request for inputs, etc. The signaling may be: by sound, lights, information on a display, etc.

Exemplary embodiments of the synchronizing mechanism may implement different prediction methods according to different inputs. Exemplary prediction may comprise estimation based on calculation according to length of cardboard, distance between modules, velocity of side grippers, feedbacks from different sensors and/or detectors, and so on. Exemplary embodiments of the synchronizing mechanism may further utilize some of the synchronizing modules as buffer. More information is disclosed in conjunction with FIG. 8*a-c*

Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

BRIEF DESCRIPTION OF THE DRAWINGS

Exemplary embodiments of the present disclosure will be understood and appreciated more fully from the following detailed description, taken in conjunction with the drawings in which:

FIGS. 4a-d depict schematic illustrations of simplified block diagram with relevant elements of an exemplary embodiment of a cardboard-fix-position conveyor, according to exemplary teachings of the present disclosure;

DETAILED DESCRIPTION OF EXEMPLARY EMBODIMENTS

Turning now to the figures in which like numerals and/or labels represent like elements throughout the several views, exemplary embodiments of the present disclosure are described. For convenience, only some elements of the same group may be labeled with numerals. The purpose of the drawings is to describe exemplary embodiments and is not for production purpose. Therefore features shown in the figures are for illustration purposes only and are not necessarily drawn to-scale and were chosen only for convenience and clarity of presentation.

Figure 1A:
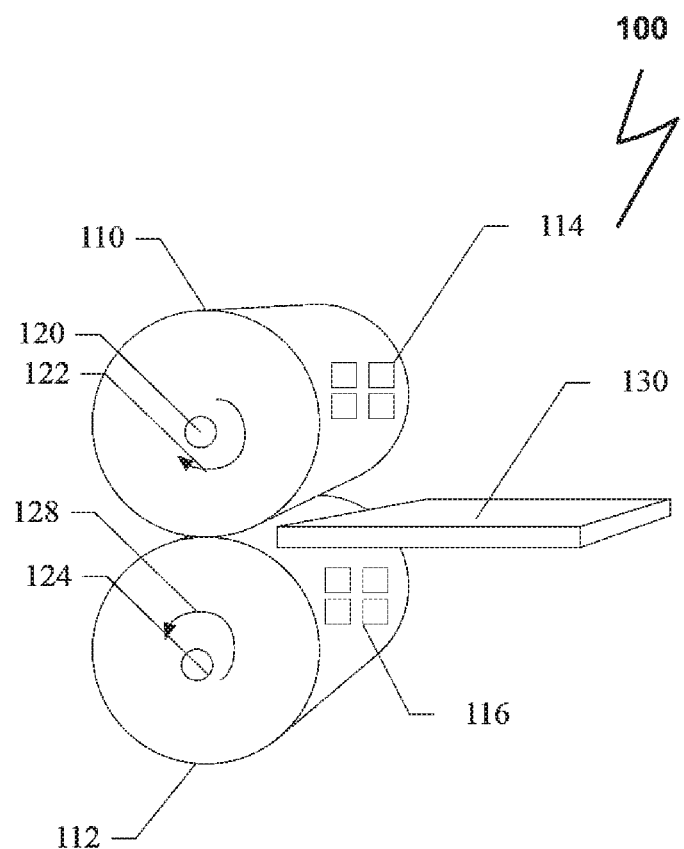
FIG. 1a-b depict a simplified block diagrams with relevant elements of an exemplary die-crease and exemplary cardboard, according to exemplary teaching of the present disclosure.

FIG. 1a schematically illustrates a simplified portion of a block diagram with relevant elements of exemplary surface-adhesive-rule dies 100. Exemplary surface-adhesive-rule dies 100 may be part of an exemplary cardboard-handling system. Exemplary surface-adhesive-rule dies 100 may comprise a rule-die 110 and a counter die 112. The rule-die 110 may comprise a plurality of rules 114. Exemplary rules 114 may be: cutting rules, creasing rules, embossing rule; a combination of them; etc. The counter die 112 may comprise a blank surface and comprise resilience material and/or may comprise trenches 116 along its circumference. The rule-die 110 and the counter die 112 may each rotate 122 and 128 respectively around their center pivot 120 and 124 respectively.

A cardboard 130 may be inserted into the gap between the rule-die 110 and a counter die 112. The cardboard may then be pre-treated by the rule-die 110 and a counter die 112. Pre-treatment may comprise: creasing, cutting, embossing, piecing, a combination of them, etc. A synchronizing mechanism may be implemented between the dies (rule-die 110 and/or the counter die 112) and one or more other modules of the cardboard-handling system. Modules such as, but not limited to: synchronized cardboard transferors, laser, etc. The synchronization may facilitate that a plurality of creases and/or cuts and/or embossing be implemented by the dies (rule-die 110 and/or the counter die 112) in the planned areas along the cardboard 130.

In other exemplary embodiments steel rule dies and counter dies may be used. More information on the surface-adhesive-rule technology (SART) and the surface-adhesive rules (SAR) flexible material, may be found in related United States applications bearing the title of "Flexible material for surface adhesive rule" having Ser. No. 13/108,312; United States non-provisional application bearing the title of "Method and system for surface adhesive rule technology" having Ser. No. 13/108,389; United States application bearing the title of "Method and system for creating co-layer surface adhesive rule" having Ser. No. 13/108,450; United States application bearing the title of "Method and system for creating surface adhesive rule counter die" having Ser. No. 13/108,526; and "Method and system for surface adhesive rule technology" assigned the Ser. No. PCT/IL 2011/000389. The above applications are incorporated herein by reference in their entirety.

Figure 1B:
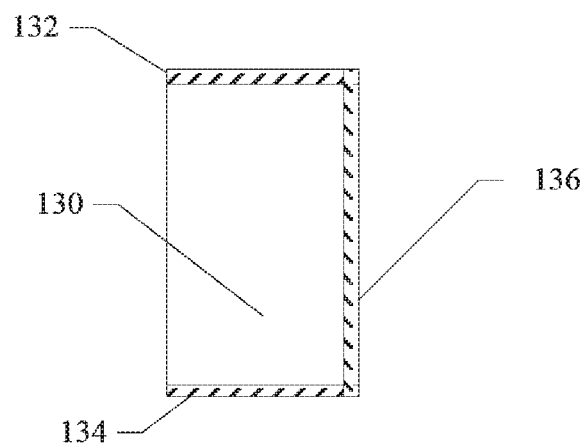

FIG. 1b schematically illustrates a simplified diagram with relevant elements of an exemplary cardboard 130. The edge of the cardboard that will be first to enter the cardboard-handling system, in the running direction, may be referred as the leading edge 132, and the opposite edge may be referred as the trailing edge 134 and the side edge 136 of the cardboard may be referred as the side-edge throughout the description drawings and claims.

Figure 2:
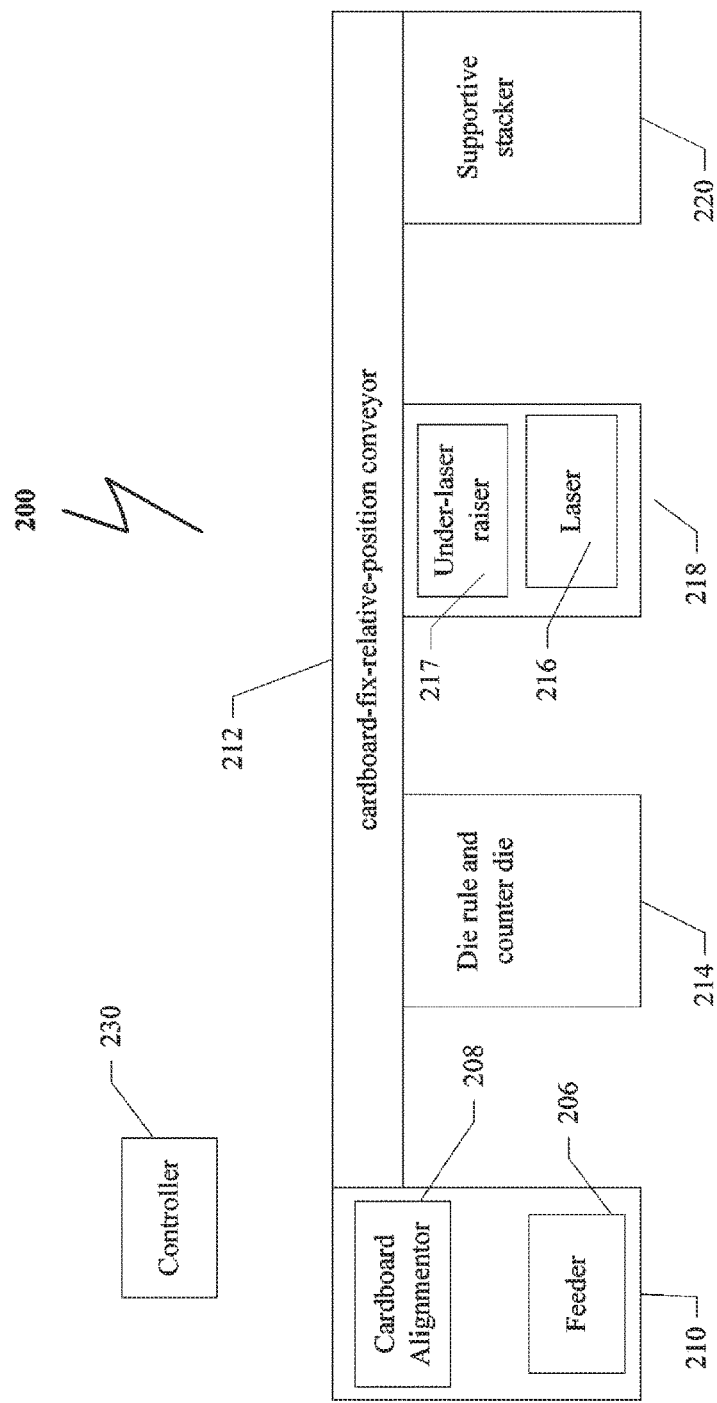
FIG. 2 is a schematic illustration of a simplified block diagram with relevant elements of an exemplary cardboard-handling system, according to exemplary teachings of the present disclosure.

FIG. 2 schematically illustrates a simplified portion of a block diagram with relevant elements of an exemplary cardboard-handling system 200. Exemplary embodiment of cardboard-handling system 200 may comprise: a cardboard input module 210; one or more cardboard-fix-relative-position conveyor 212; one or more die rules and counter dies 214; one or more laser treatment modules 218; and one or more supportive stackers 220. The cardboard-handling system 200 may further comprise one or more synchronizing mechanisms and/or a controller 230. Other exemplary embodiments of a cardboard-handling system 200 may not comprise all of the above mentioned modules and/or may comprise more of the same modules and/or more different modules. Yet in other exemplary embodiments of a cardboard-handling system 200 the above modules may be arranged in a different order, and so on.

Exemplary embodiment of the cardboard input module 210: may comprise a cardboard feeder 206 and a cardboard alignmentor 208 and one or more cardboard transferors (not shown in drawing). The feeder 206 may be positioned in line with the alignment system and both according to the running direction of the cardboard-handling system 200. The feeder 206 may grab a cardboard and transfer it toward the cardboard alignmentor 208. The cardboard alignmentor 208 may align the cardboard to the required direction and position (running direction of the machine, for example). In some exemplary embodiments the cardboard alignmentor 208 may also convey the cardboard toward the next module of the cardboard-handling system 200. An exemplary cardboard-alignmentor may align the cardboard to the required position while conveying it toward the next module of the cardboard-handling system. Advantageously, enabling the system to continue its flow while alimenting occurs. In other embodiments the alignment may be done while stopping the system throughput, for example.

The one or more cardboard-fix-relative-position conveyor 212 may grab the cardboard and lead it in a fix-relative-position toward and/or through one or more modules of the cardboard-handling system 200. Thus the cardboard-fix-relative-position conveyor 212 may convey a cardboard before been pre-treated, while it is been pre-treated and after it has been pre-treated, for example. An exemplary cardboard-fix-relative-position conveyor 212 may be a side gripper for example. In some exemplary embodiments the cardboard-fix-relative-position conveyor 212 may convey the cardboard through all the modules of the cardboard-handling system 200. In other exemplary embodiments the cardboard-fix-relative-position conveyor 212 may convey the cardboard through part of the cardboard-fix-relative-position conveyor 212. The cardboard-fix-relative-position conveyor 212 may be synchronized with one or more modules of the cardboard-handling system 200.

The cardboard may pass through the one or more die rules and counter dies 214, for pre-treatment. The cardboard-fix-relative-position conveyor 212 may be synchronized with the one or more die rules and counter dies 214. The die's rules may be creasing rules, cutting rules, piercing rules, embossing rules, a combination of them, etc. The synchronization may verify that the dies are placed in the required position relative to one another and to the cardboard. If not the dies may be rotated till they are placed correctly and only the cardboard-fix-relative-position conveyor 212 may convey the cardboard toward and/or through die rules and counter dies 214 to be pre-treated.

The cardboard-fix-relative-position conveyor 212 may convey the cardboard toward and/or through one or more laser treatment modules 218. An exemplary embodiment of a laser treatment module 218 may comprise: a laser 216 and an under-laser raiser 217 and one or more cardboard transferors (not shown in drawing). The laser's beam 216 may cut the cardboard at pre-defined patterns, for example. The under-laser raiser 217 may stable the cardboard in a fix position while the laser 216 is working on the cardboard.

In some exemplary embodiments the under-laser raiser 217 may also act as a conveyor of the cardboard. The base of the under-laser raiser may be a belt and/or associated to a belt, for example. A synchronization may be implemented between the under-laser raiser 217 and one or more modules of the cardboard-handling system, for example. For example a synchronization may be implemented between the cardboard-fix-relative-position conveyor 212 and the under-laser raiser 217.

The synchronization may be implemented by using a timing belt, for example. The cardboard-fix-relative-position conveyor 212 and the under-laser raiser belt 217 may have the same timing-belt's pitch between teeth and may both be driven by the same shaft, for example. They may both have similar pulley dimensions, etc. Exemplary pitch between teeth of a timing belt can be around a few mm (10 mm, for example).

The cardboard-fix-relative-position conveyor 212 may convey the cardboard toward and/or through one or more supportive stackers 220. An exemplary supportive stacker 220 may transfer the pre-treated cardboard, while supporting the cardboard in a substantially flat situation, for example, over to a stack of pre-treated cardboards. The supportive stacker may release the pre-treated cardboard at a pre-treated cardboard's required final position. An exemplary embodiment of a supportive stacker 220 may comprise a dynamic-size holder that may grip the pre-treated cardboard, from an area of the pre-treated cardboard top surface.

In some exemplary embodiments supportive stacker 220 may be in line with the module before it. In an exemplary embodiment the cardboard-fix-relative-position conveyor 212 may lead the cardboard through the supportive stacker 220. In other embodiments cardboard-fix-relative-position conveyor 212 may only lead the cardboard toward the supportive stacker 220. The cardboard-fix-relative-position conveyor 212 and the supportive stacker 220 may be synchronized.

In some embodiments the synchronization between modules may be mechanical. In other embodiments the synchronization may be by electric circuits. Yet other embodiments may be a combination of them. In an exemplary embodiment the controller 230 may obtain information from different detectors and/or sensors and/or user inputs. Accordingly the controller 230 may send commands toward one or more modules for synchronize.

Figure 3A:
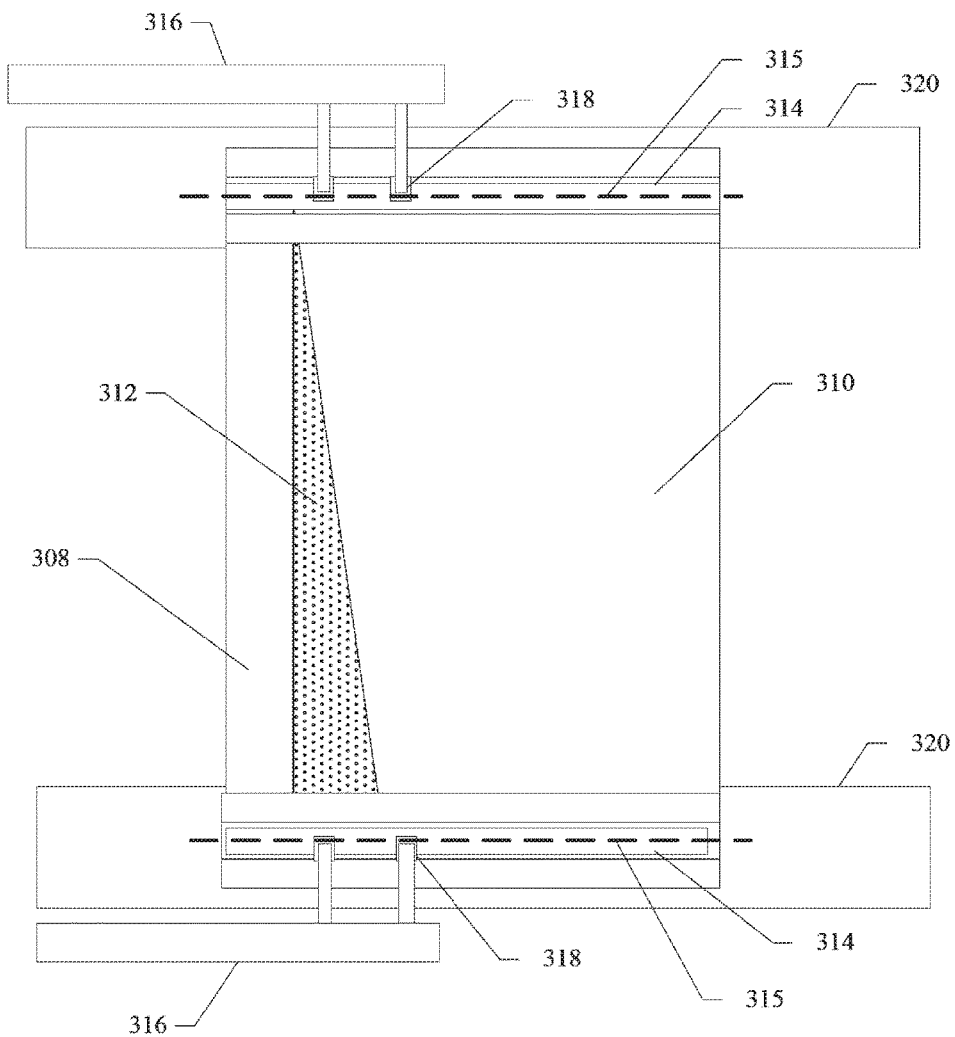
FIGS. 3a-b depict schematic illustrations of simplified block diagram with relevant elements of an exemplary embodiment of an cardboard-alignmentor and cardboard transferror, according to exemplary teachings of the present disclosure.

FIG. 3a depicts a schematic illustration of simplified block diagram with relevant elements of an exemplary cardboard-alignmentor 310. An exemplary cardboard-alignmentor 310 may align the cardboard to a required position in relation to a cardboard-handling system. In some embodiments one or more cardboard-alignmentor 310 may be placed at different locations along a cardboard-handling system. In an exemplary embodiment a cardboard-alignmentor 310 may be located near the beginning of the cardboard-handling system.

Exemplary embodiment of a cardboard-alignmentor 310 may align a cardboard to a direction substantially similar to the machine's running direction. Exemplary embodiments the cardboard-alignmentor 310 may align the cardboard in a diagonal-like direction in relation to the machine's running direction till the cardboard is aligned in a direction similar to the machine's running direction. Cardboard-alignmentor 310 may convey the cardboard toward the next module of the cardboard-handling system, while aligning the cardboard. An exemplary cardboard-alignmentor may align the cardboard to the required position while conveying it toward the next module of the cardboard-handling system. Advantageously, enabling the system to continue its flow while alimenting occurs. In other embodiments the alignment may be done while stopping the system throughput, for example.

Exemplary embodiment of a cardboard-alignmentor 310 may comprise: one or more alignment bars 308, and one or more alignment conveyers 312. An exemplary alignment bar 308 may be placed substantially parallel to the machine's running direction. An exemplary aligning bar 308 may include: a rail and/or a side-wall substantially parallel to the machine's running direction, for example. An exemplary alignment conveyor 312 may comprise a belt. The belt may be a rectangle-like shape and placed in a diagonal-like direction in relation to the machine's running direction.

The conveyor belt 312 may be a combination of a pierced belt and a vacuum mechanism underneath it (not shown in drawing), for example. The vacuum may couple a cardboard to the pierced belt 312; the pierced belt 312 may move in diagonal direction, in relation to the machine's running direction, toward the aligning bar and running direction; and the cardboard may be aligned along the aligning bar 308, for example. The vacuums level may be adjust during and/or before the alignment, the vacuum level may be different along the belt. Thus the coupling force may differ along the belt.

Exemplary embodiments of a cardboard-alignmentor 310 may be associated to a plurality of synchronized-cardboard transferors. The synchronized-cardboard transferors may comprise a plurality of cardboard transferors 320. Exemplary embodiments of a cardboard transferor 320 may comprise: one or more cardboard leading mechanism and one or more transferor. An exemplary embodiment of a cardboard leading mechanism may be one or more pinch rollers 318. An exemplary embodiment of transferor may be one or more nip rollers 314. The one or more pinch rollers 318 may be held by an adjustable girder 316. The adjustable girder 316 height and placement may be adjustable, for example.

A nip roller 314 may be a rotatable cylinder, for example. Nip roller 314 may rotate around its center axis 315, for example. A pinch roller 318 may be a rotatable disc, for example. A cardboard may be placed on top of the nip roller 314 and beneath the pinch roller 318. The Cardboard may be coupled to the nip roller by pressure impressed by the pinch roller 318 together with the adjustable girder 316, for example. Thus when the nip roller 314 will rotate around it's center, the pinch roller 318 may automatically rotate around its center, together with the pressure imposed, by the adjustable girder 316, on the cardboard the cardboard may move through the pinch roller 318 and nip roller 314 in a direction substantially similar to the nip roller 314 rotating direction.

Further the placement of the pinch roller 318 in relation to the nip roller 314 may create a diversion to the cardboard's movement transferred by the nip rollers 314, for example. An exemplary diversion of the cardboard's movement may be toward an alignment bar 308, for example. In some exemplary embodiments the cardboard transferor 320 may be part of a cardboard alignment mechanism 310.

An exemplary cardboard transferor 320 may get a cardboard and transfer it toward the cardboard-alignmentor 310. After the cardboard has been aligned another cardboard transferor 320 may get a cardboard and transfer it toward the next module of the cardboard-handling system, for example. Exemplary embodiments of cardboard transferor 320 may be synchronized to get the cardboard at a certain time and/or area and to transfer it further, and so on. The synchronization may be achieved in different ways. Exemplary way may be: using a controller, using one or more detectors, one or more feedback mechanism, a combination of the above, and so on.

In some exemplary embodiments after the cardboard-alignmentor 310 another cardboard transferor 320 may be used. The cardboard transferor 320 after the cardboard-alignmentor 310 may further align the cardboard, using the nip roller placement, for example. The procedure of align the direction of a cardboard by more then one mechanism one after the other may increase the alignment accuracy.

The cardboard transferors 320 may be synchronized with the cardboard-handling system. In some exemplary embodiments the synchronization may be implemented by a controller and one or more: sensors, and/or detectors, and/or measurement devices along the path of the cardboard. An exemplary controller may comprise one or more servo drivers, for example. The synchronization may be between different modules. Exemplary modules may be: between the two or more cardboard transferors 320, between at least one of the cardboard transferors 320 and one or more other modules of the cardboard-handling system, a combination of the above, and so on The synchronization between the one or more cardboard transferor 320 along the cardboard-handling system may be implemented in different ways. Exemplary ways may comprise: using the same engine to rotate two or more nip rollers 314 placed in different areas along the system, using a timing belt, etc. In some exemplary embodiments the synchronization may comprise detecting and/or measuring a shift in the cardboards direction from the wanted and/or pre-calculated direction, detecting and/or measuring a shift in the cardboards velocity from the wanted and/or pre-calculated velocity, and so on. Accordingly the synchronization mechanism may alter the rotation and or velocity of the one or more cardboard transporter 320, and/or the velocity of other modules along the cardboard-handling system, etc.

The detecting and/or measuring of a shift in the cardboards direction and/or velocity may be implemented in different ways. Exemplary ways may be: by getting the length of the cardboard; getting inputs from one or more detectors and/or sensors along the path on the placement of the cardboard; using inputs of the dimensions of the cardboard-handling system and calculating accordingly. The inputs on the length of the cardboard may be input by an operator and/or measured by the cardboard-handling system. Exemplary method and system for measuring the cardboard length may be by detecting when the leading edge of the cardboard has passed a sensor detecting when the other edge (trailing edge) of the cardboard passes the sensor, receiving inputs on the velocity of the cardboard and accordingly calculating the length of the cardboard.

Figure 3B:
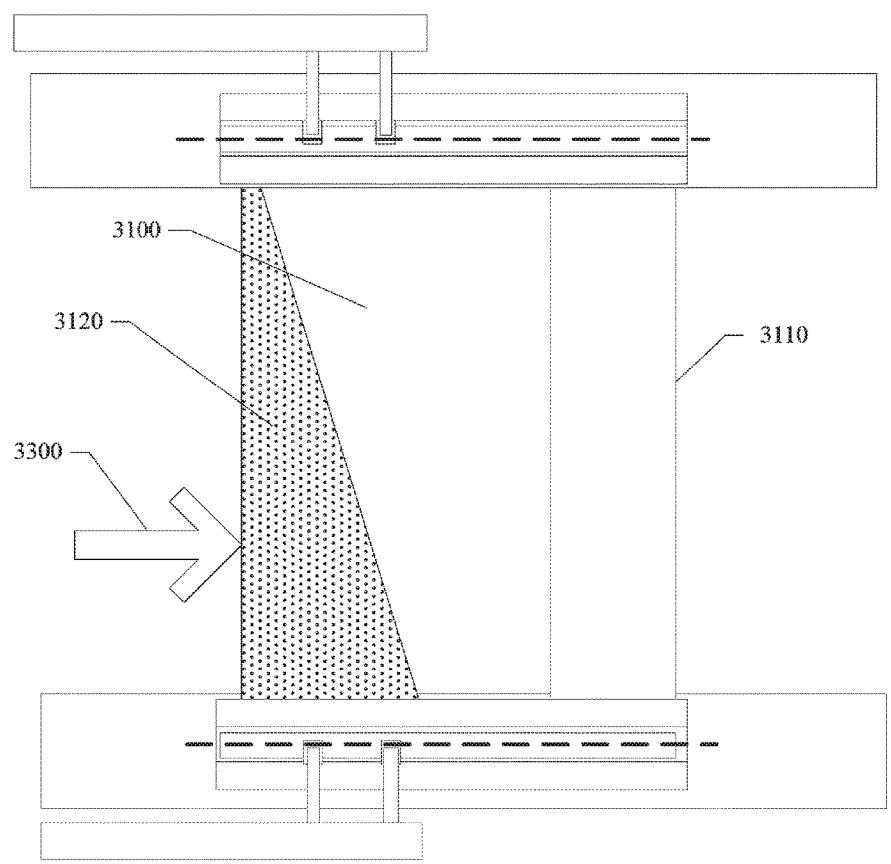

FIG. 3b depicts a schematic illustration of simplified block diagram with relevant elements of an exemplary cardboard-alignmentor 3100. An exemplary cardboard-alignmentor 3100 may maybe similar to cardboard-alignmentor 310 of FIG. 3a but may further comprise a sided aligning mechanism. The sided aligning mechanism (not shown in drawing) may increase or decrease the cardboard-alignmentor 3100 size in the cross like direction as indicated by arrow 3300 or opposite to the direction as indicated by arrow 3300, for example. In the increase mode the cardboard-alignmentor size may be increase to 3100, for example. This may be used for different width cardboard projects, for example. in some exemplary embodiments the angle of the belt 3120 may also be altered according to project.

FIG. 4a depict schematic illustrations of simplified block diagram with relevant elements of an exemplary embodiment of a cardboard-fix-position conveyor 400a. An exemplary cardboard-fix-relative-position conveyor 400a may convey a cardboard through one or more modules of a cardboard-handling system, while carrying the cardboard in a fix position in relation to the cross and/or main direction of the cardboard-handling system, for example.

Exemplary embodiments of a cardboard-fix-relative-position conveyors 400a may be a side gripper, for example.

An exemplary side gripper may grip one side of the cardboard, advantageously the cardboards may be in different width, without the need to adjust the cardboard-fix-relative-position conveyors 400a to each cardboard width. Some side grippers may have a self-adapted gripping space 418, for example. Advantageously the cardboards may be in different thickness, without the need to adjust the cardboard-fix-relative-position conveyors 400a to each cardboard width.

An exemplary embodiment of a side gripper with a self-adapted gripping space 418 may comprise two belts: an upper belt 412a and a lower belt 412b, for example. A cardboard may be placed between the upper and lower belt at the gap 418. The belts may move in a direction similar and/or opposite to the direction indicated by arrow 480, thus conveying the cardboard along with them. In one exemplary embodiment upper belt 412a may be in a fixed height, while the lower belt 412b may have a dynamic height. An exemplary embodiment of a dynamic-height belt may comprise one or more spring load 416, for example, coupled to the dynamic-height belt (lower belt 412b, in this exemplary embodiment). The spring load 416 may push the lower belt 412b toward the upper belt 412a, and thus cardboards with different thickness may be fixed between the two belts 412a and 412b, automatically.

Other exemplary embodiments of a dynamic-height belt may comprise a springs pneumatic cylinders; and/or pneumatic pressure; and/or fluid pressure etc. In other embodiment both belts may have a dynamic height, and so on. Load in between the side gripper belts may vary according to different material properties and/or characteristics of the cardboard, for example. Furthermore in some exemplary embodiments the load may also vary according to different production parameters. Parameters such as, but not limited to: speed and/or die patterns, etc.

In some exemplary embodiments the spring load may be held back, thus creating a wide gap 418 between the two belts 412a and 412b, until it is detected that a cardboard is entering the side gripper 400a and then the spring load 416 may be released to create the required pressure and adapted gap between the two belts 412a and 412b. In other exemplary embodiments the spring load 416 may be supple enough that a cardboard entering the side gripper may push the belts 412a and 412b further from each other in contrast to the spring load 416, to a point that the gap 418 between the belts 412a and 412b matches the cardboard width, and so on. Other embodiments may comprise a different mechanism than the spring load. Other exemplary embodiments may comprise: rollers and/or chain systems, and so on.

FIG. 4b illustrate an A-A section of FIG. 4a and depicts a schematic illustrations of a simplified block diagram with relevant elements of an exemplary embodiment of a cross-limit-guarder 400b. An exemplary cross-limit-guarder may guard 400b that the cardboard will not move in the cross direction more than a predefined limit from a desirable position. Exemplary predefined limit may be a few millimeters (5-15 mm, for example).

An exemplary embodiment of a cross-limit-guarder, when using the two belts described above (412a and 412b FIG. 4a), may be by using belts 420a&b with a step-like shape 422a&b along their cross direction. The length of the step-like shape 422a&b may be substantially similar to the length of the predefined limit, for example. Other embodiments may use a bar along the belts, and so on. The cross-limit-guarder may guard that the belts and/or cardboard will not rip and/or tear FIG. 4c depict schematic illustrations of simplified block diagram with relevant elements of an exemplary embodiment of upper belt 432 and lower belt 436 having cross-limit-guarder may guard with a pre-defied length 430.

FIG. 4d depict schematic illustrations of simplified block diagram with relevant elements of an exemplary embodiment of upper belt 432 and lower belt 436 having cross-limit-guarder 430. The cross-limit-guarder 430 may further comprise a stop-like mechanism 440.

Figure 5:
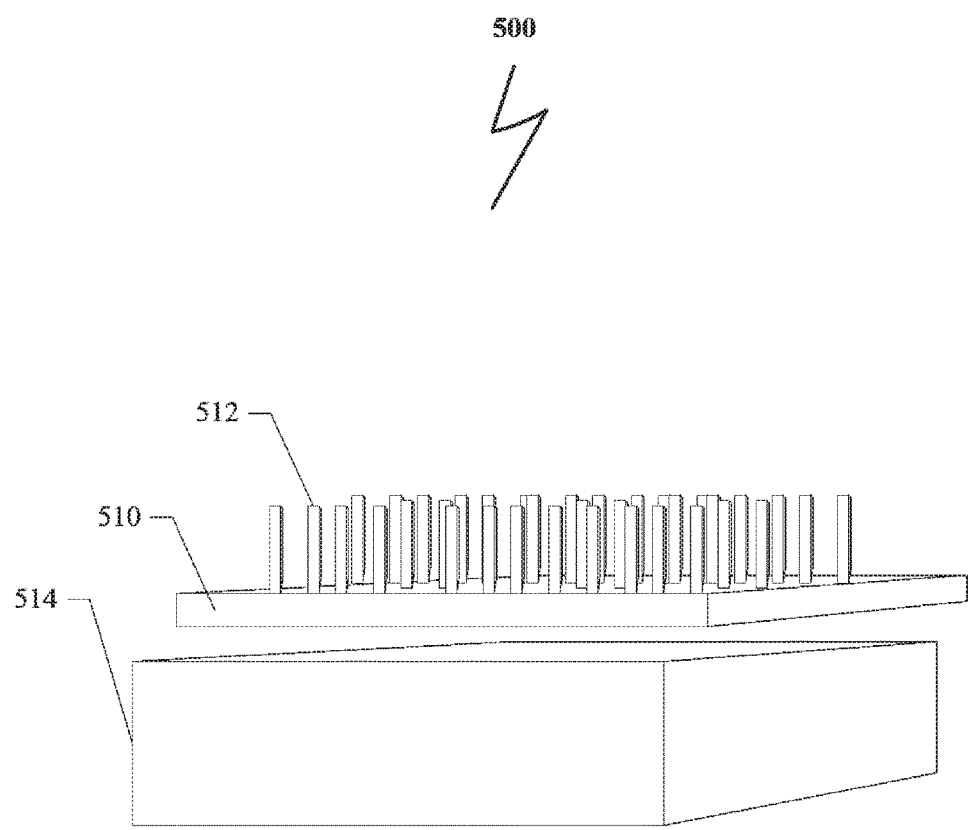
FIG. 5 depicts a schematic illustration of a simplified block diagram with relevant elements of an exemplary embodiment of an under-laser raiser, according to exemplary teachings of the present disclosure.

FIG. 5 depicts a schematic illustration of a simplified block diagram with relevant elements of an exemplary embodiment of an under-laser raiser 500. The under-laser raiser 500 may stable the cardboard in a fix position while a laser's beam is working on the cardboard. The under-laser raiser 500 may comprise: a plurality of protruding elements 512, substantially parallel one to the other. The plurality of protruding elements 512 may protruded from a base 510. Exemplary protruding elements 512 may have a needle-like shape, for example. Exemplary base 510 may be a polymer based material, and so on. A cardboard may be placed in a horizontal position on the top of the protruding elements 512, for example.

A coupling and stabling mechanism may be used to couple and stable the cardboard to the top of the protruding elements 512. Exemplary coupling and stabling mechanism may comprise a plurality of openings (gaps) in the base 510 (not shown in drawing) and a suction mechanism may be used. Suction mechanism such as, but not limited to a vacuum generator 514, for example. The suction mechanism may couple and stable the cardboard to the top of the protruding elements 512. Other exemplary embodiments for coupling and stabling a cardboard to a substrate and/or top of the protruding elements 512 may be by imposing air from above the cardboard and substantially perpendicular to the cardboard's surface, for example. Other exemplary embodiments may be a combination of the above, and so on.

Some exemplary embodiments the base may be made of a plurality of straps. The straps may be with holes. In other embodiments the straps may be without holes but with gaps between two or more straps, advantageously enabling the suction underneath to affect the cardboard.

In exemplary embodiments in which the under-laser raiser 500 acts as a conveyor of the cardboard as well, the base 510 of the under-laser raiser may be a belt and/or associated to a belt, for example. A synchronization may be implemented between the under-laser raiser 500 and one or more modules of the cardboard-handling system, for example. For example synchronization may be implemented between the side gripper and the under-laser raiser.

In exemplary embodiments the height of the protruding elements 512 may be designed such that the focal point of the laser beam will not strike the base 510 of the under-laser raiser 500, advantageously protecting the base 510 from the maximum heat of the laser beam. The top of the protruding elements 512 may be designed to have a small surface such that if and/or when the laser beam hits the protruding element it will hit only a small area. The length (height) of the protruding elements 512 may also be designed such that if and/or when a laser beam strikes a protruding element the heat will cool along the length of the protruding element before reaching the base 510. Further, in some exemplary embodiments the material of the protruding element 512 may be resistance to heat. The shape of the protruding elements 512 may be diamond-like cross shape, narrower at the top end and at the base end in relation to the middle part of it, for example, and so on.

In some exemplary embodiments the material of the protruding element 512 may be such that light will not reflect from it. In other exemplary embodiments part of the protruding element may be coated with anti-reflect coating. Some exemplary embodiments the material of the base 510 may be glass fiber weaved to a textile. The glass fiber weaved to a textile may protect the base from laser beam heat, for example. Further glass fiber weaved to a textile may deviate laser beam into many different directions. Other exemplary material that may be used for the base 510 may be Nano structured surfaces, carbon fiber material, and so on.

Yet other exemplary embodiments the material of the base 510 of the under-laser raiser may be coated with an anti-reflecting coating and/or comprise light absorbing attributes. Some exemplary embodiments the base 510 and/or the protruding elements 512 may be coated with ceramic particles. Laser beam resistant material particles that will not reflect the laser light directly back to the cardboard but more in cross direction. Advantageously defocusing a laser beam that hits them, for example. Furthermore, space in between the ceramic grains may provide air flow capability. The air flow may enable the vacuum from the vacuum generator 514 to remove the smoke away from the cardboard, and so on. Some of the embodiments may be a combination of two or more of the above, etc.

Figure 6:
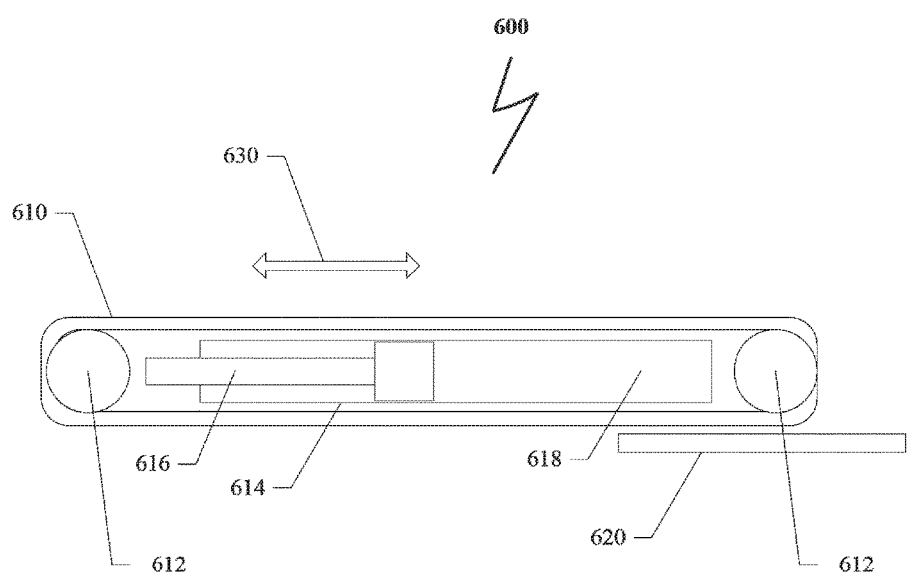
FIG. 6 depicts a schematic illustrations of a simplified block diagram with relevant elements of an exemplary embodiment of a dynamic-size holder, according to exemplary teachings of the present disclosure.

FIG. 6 depicts a schematic illustration of a simplified block diagram with relevant elements of an exemplary embodiment of a dynamic-size holder 600. Exemplary dynamic-size holder 600 may be part of a supportive stacker, for example. The dynamic-size holder 600 may transfer a pre-treated cardboard 620, while supporting the cardboard in a substantially flat situation, for example, over to a stack of pre-treated cardboards. The dynamic-size holder 600 may release the pre-treated cardboard 620 at a pre-treated cardboard's required final position. Exemplary dynamic-size holder 600 may grip the pre-treated cardboard 620 from the pre-treated cardboard's 620 top surface.

In some exemplary embodiments the dynamic-size holder 600 may grip the pre-treated cardboard 620 from its leading edge all through till its other edge (trailing edge). In other exemplary embodiments the dynamic-size holder 600 may grip the pre-treated cardboard 620 from the pretreated cardboard's top edge in the leading edge alone. The dynamic-size holder 600 may transfer the pre-treated cardboard 620 over to the stack of pre-treated cardboard and release it at the pre-treated cardboard's final position. The release may be gradual or in one stroke.

An exemplary embodiment of a dynamic-size holder 600 may comprise: an adjusted-vacuum chamber 614 that may generate vacuum. An exemplary adjusted-vacuum chamber 614 may be adjusted 618 according to the cardboard's 620 length and/or width, for example. The length of the cardboard 620 may be measured, and/or detected, and/or calculated, and/or inserted by a user to the cardboard-handling system and/or to the supportive stacker itself.

An exemplary embodiment of an adjusted-vacuum chamber may further comprise: a vacuum belt 610 with a plurality of opening in it (not shown in drawing) and a piston mechanism, for example. In an exemplary embodiment the piston mechanism may comprise a moving cylinder 616 that may move inside the adjusted-vacuum chamber 614 and reveal a required area of openings along the adjusted-vacuum chamber 614 and vacuum belt 610. The required area of openings may be according to the pre-treated cardboard's length 620 and/or according to a required location, for example. Two or more axis 612 may be used by the vacuum belt 610 as axis points, for example.

The movement of the piston may be in a direction substantially similar to the running direction of the machine and vice versa as shown by arrow 630, for example. In some exemplary embodiments the area of the openings along the adjusted-vacuum chamber 614 may be adjusted in the cross direction. In other embodiments a combination of them may be implemented.

In some exemplary embodiments the pre-treated cardboard may be released at its final position. The release may be implemented in different ways. Exemplary ways may be: by stopping the vacuum; when the holes (openings) in the vacuum belt 610 at the leading edge of the cardboard pass the moving cylinder 616 which may limit the vacuum area; etc. In some exemplary embodiments the piston mechanism may be adjusted according to the cardboard 620 size and/or predefined area.

The supportive stacker may be synchronized with one or more modules of the cardboard-handling system. One exemplary embodiment of synchronization may be by a timing belt associated to the vacuum belt 610 and to the side gripper for example. Thus the vacuum belt 610 may start its movement and velocity according to synchronizing inputs, and so on. Other exemplary synchronizing mechanism may be by applying one or more servo drivers and electronic synchronization.

Figure 7:
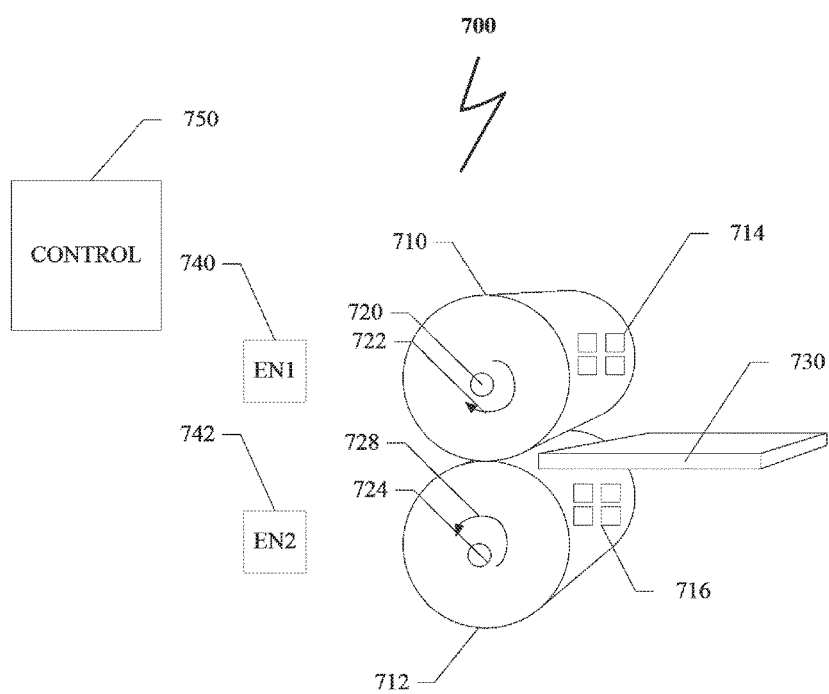
FIG. 7 depicts a schematic illustrations of a simplified block diagram with relevant elements of an exemplary embodiment of a synchronized die-crease, according to exemplary teachings of the present disclosure.

FIG. 7 depicts a schematic illustration of a simplified block diagram with relevant elements of an exemplary embodiment of a synchronized die-crease 700. Exemplary synchronized die-crease 700 may be part of an exemplary cardboard-handling system. Exemplary synchronized die-crease 700 may comprise a rule-die 710 and a counter die 712. The rule-die 710 may comprise a plurality of rules 714. Exemplary rules 714 may be: cutting rules, creasing rules, embossing rule; a combination of them; etc. The counter die 712 may comprise a blank surface and comprise resilience material and/or may comprise trenches 716 along its circumference. The rule-die 710 and the counter die 712 may each rotate 722 and 728 respectively around their center pivot 720 and 724 respectively.

A cardboard 730 may be inserted into the gap between the rule-die 710 and a counter die 712. The cardboard 730 may then be pre-treated by the rule-die 710 and a counter die 712. Pre-treatment may comprise: creasing, cutting, embossing, piercing, a combination of them, etc. A synchronizing mechanism may be implemented between the dies and one or more other modules of the cardboard-handling system. Exemplary embodiment of a synchronized die-crease 700 may further comprise one or more encoders 740 and 742. Encoders 740 and 724 may send and/or get information to and from a controller 750, for example.

The controller 750 may control one or modules of a cardboard-handling system. The controller 750 may obtain information and/or commands from other modules of the cardboard-handling system. The controller 750 may send information and/or commands to other modules of the cardboard-handling system. Other modules such as, but not limited to: synchronized cardboard transferors; cardboard-fix-relative-position conveyor; the engines that rotate the dies 710 and 712; etc.

The controller 750 may be a servo, for example. The encoders 740 and 742 may be mechanical encoders, optical encoders, etc. Other exemplary controlling means may be gear boxes such as, but not limited to: mechanical overriding drives and/or more general other mechanical means to adjust angular positions.

The circumference of each die (710 and 712) may be numbered from 0 to 360, for example. A predefined reference point may also be defined. For example the point numbered 0 of each die's (710 and 712) circumference.

Exemplary encoders (740 and 742) may detect the position of the circumference of the die (710 and 712, respectively) in relation to a predefined reference. The encoders (740 and 742) may transfer the information toward the controller 750. The controller may determine according to different criteria whether to rotate one or more of the dies 710 and/or 712 to a different angle in reference to the reference point for example; and/or to accelerate or decelerate the arrival of the cardboard 730 toward the dies by synchronized cardboard transferors and/or cardboard-fix-relative-position conveyor for example; and so on. Exemplary different criteria may be: the position of the rules of the rule-die 710 and/or trenches of the counter die 712 in relation to one another and/or in relation to the cardboard 730 coming toward the dies (rule-die 110 and/or the counter die 112); etc.

Accordingly the controller 750 may send commands to relevant modules. Relevant modules such as, but not limited to: the dies engines; the synchronized cardboard transferors; one or more other controllers; one or more cardboard-fix-relative-position conveyor; etc. The synchronization may facilitate that a plurality of creases and/or cuts and/or embossing be implemented by the dies (rule-die 110 and/or the counter die 112) in the planned areas along the cardboard 130, for example.

Figure 8A:
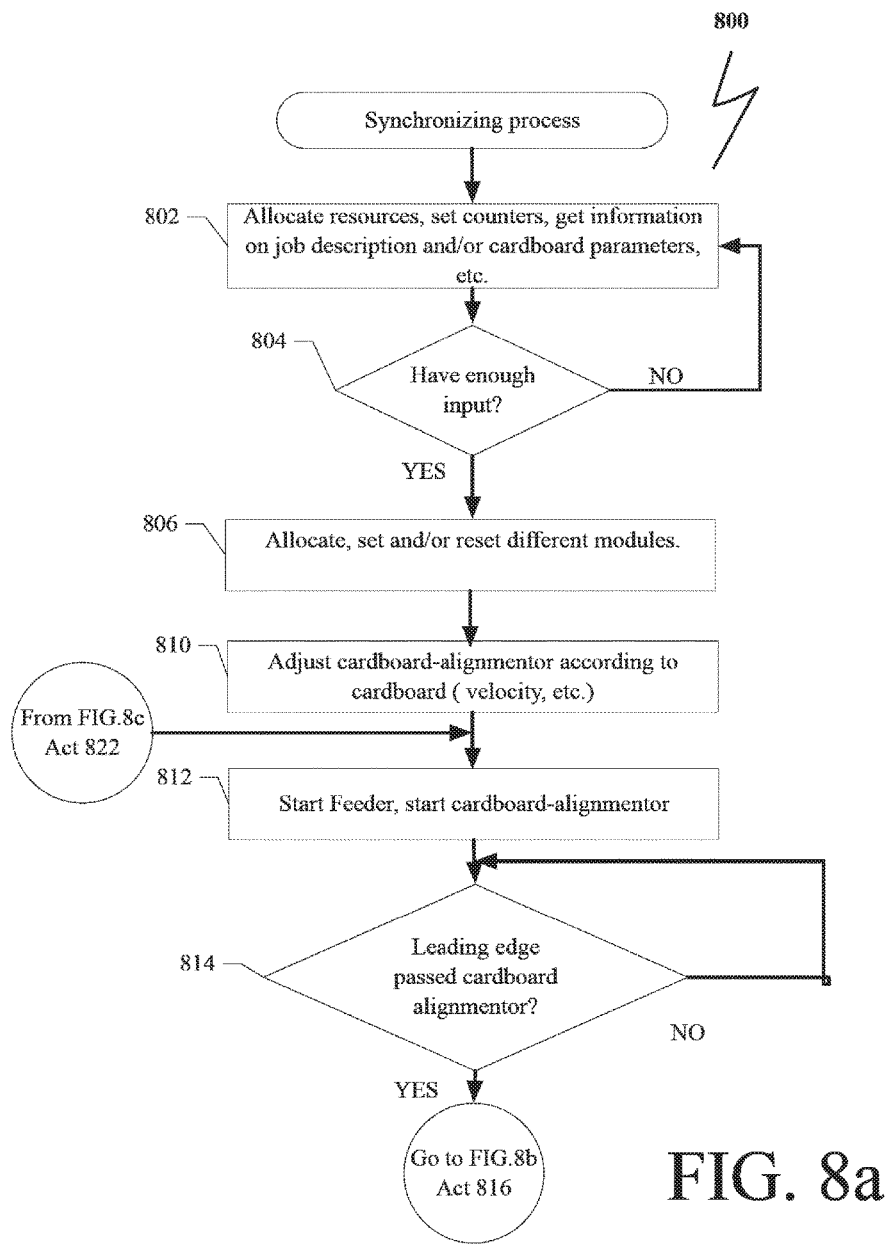
FIG. 8a-c are a schematic illustrations of a flowchart showing relevant acts of an exemplary method of a synchronizing mechanism, according to exemplary teachings of the present disclosure.
Figure 8B:
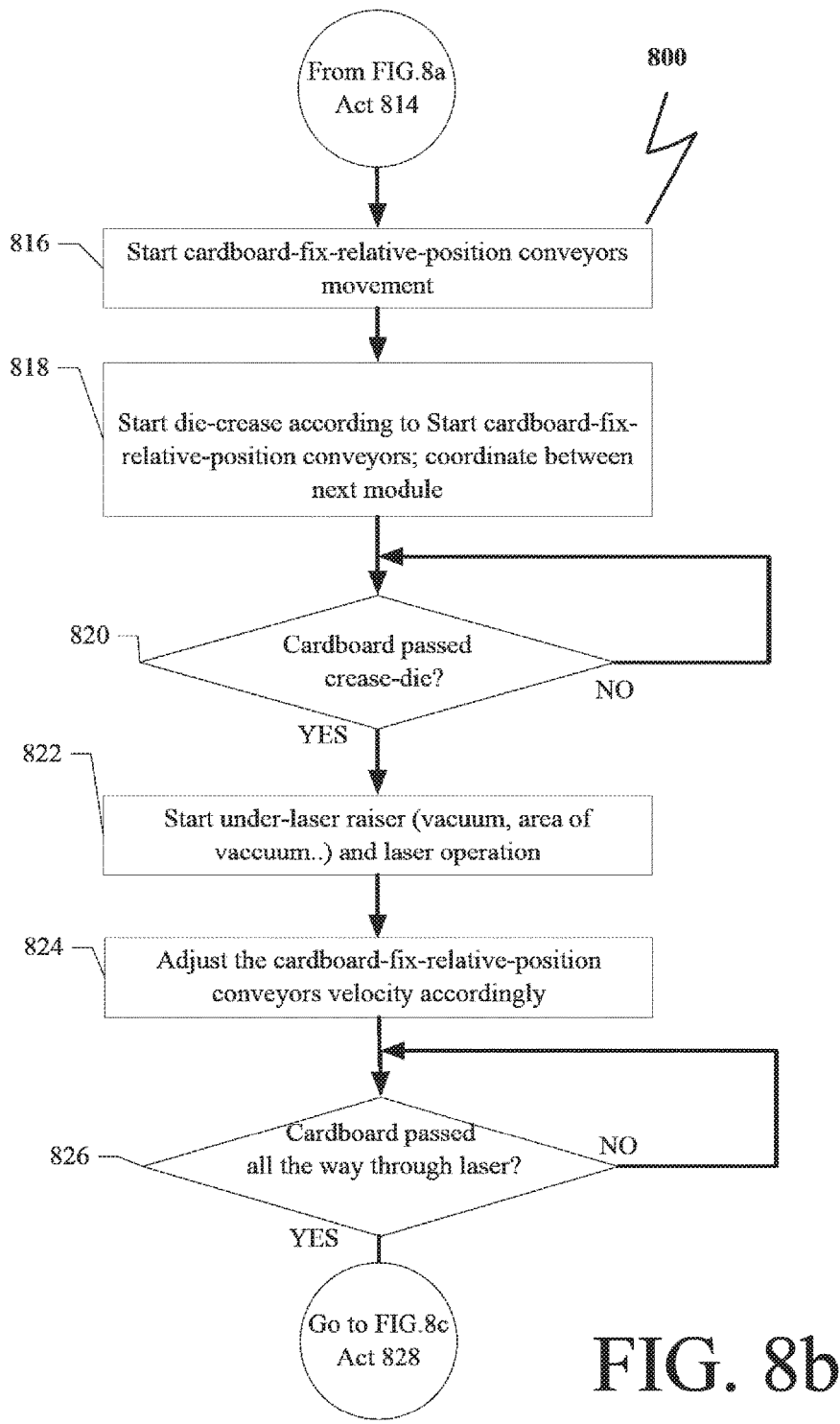
Figure 8C:
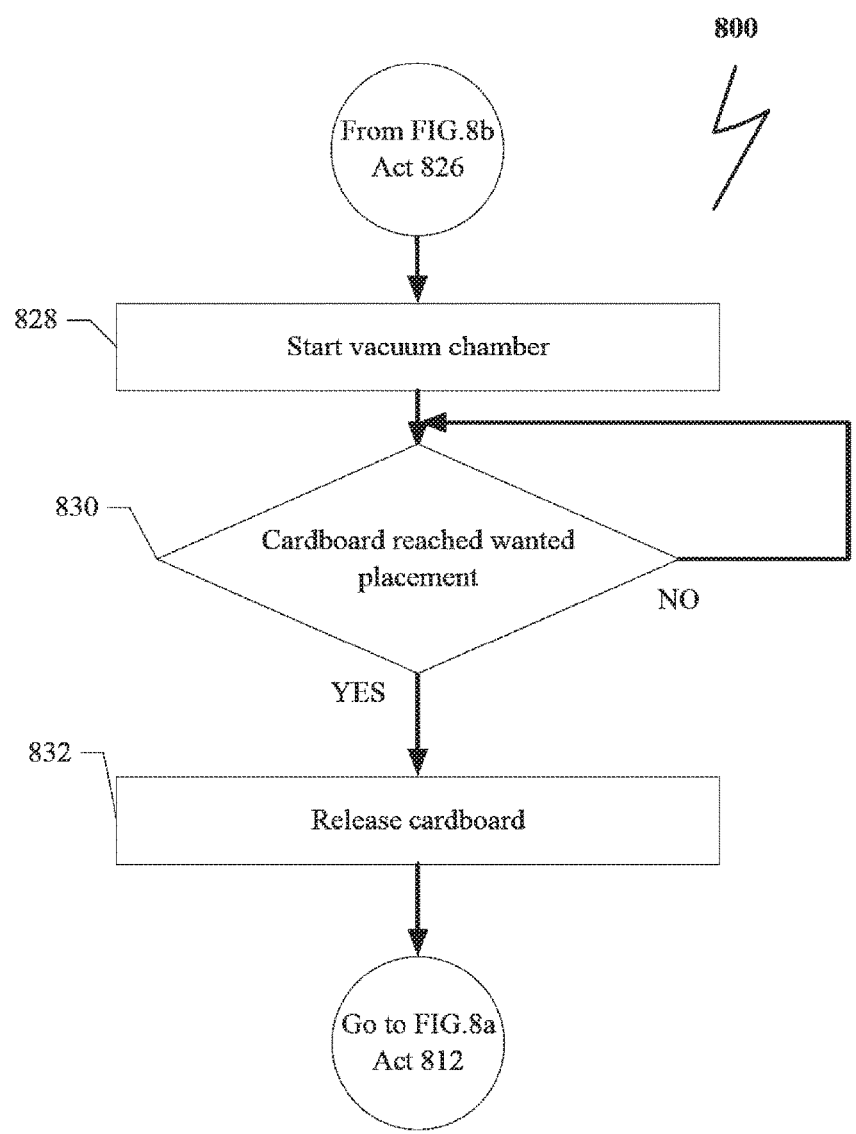

FIG. 8 is a schematic illustration of a flowchart showing relevant acts of an exemplary synchronizing method 800. In some exemplary embodiments the method 800 may begin on power up of a cardboard-handling system. In other exemplary embodiments method 800 may be initiated by different modules and/or by an operator, for example. Method 800 may be executed by a controller of a cardboard-handling system, for example. Upon initiation 802 method 800 may allocate 802 different resources. Exemplary resources may be counters, memory storages, interface between modules, interface to other different cardboard-handling system modules; etc.

Method 800 may get 802 information regarding a job description. Exemplary information may be: cardboard width/length/material, layout of creasing/cutting/embossing/piercing, etc. The information may be obtained 802 from a user and/or detected/measured 802 by detectors/sensors, etc. Once enough information has been gathered 804, method 800 may proceed to act 806.

According to the obtained information method 800 may allocate 806 the required modules and set 806 them accordingly. For example, the cardboard transferor may receive information regarding the initial velocity required to transfer the cardboard; the die's engine may receive information regarding the initial velocity required; the supportive stacker may receive initial information for the placement of the moving cylinder; the aligning bar may receive information regarding the position of the pinch rollers; etc.

Next cardboard alignmentor may be adjusted 810. Exemplary adjustment may be: the placing of the pinch rollers; the initial velocity of the nip rollers; the initial velocity of the vacuum belt; etc. Next the feeder may begin feeding 812 cardboards into the cardboard alignmentor, and the cardboard alignmentor may align the cardboard. Once method 800 has detected that the cardboard has been aligned and its leading edge has passed a predefined detector and/or sensor, method 800 may proceed to act 816 FIG. 8b. The detection may be implemented by a detector and/or sensor at the output of the cardboard alignmentor, for example. Once the detector and/or sensor detects/senses 814 that the leading edge of the cardboard has passed near it, the detector may indicate the information to a controller, for example.

At act 816 a cardboard-fix-relative-position conveyor may begin its movement. The cardboard-fix-relative-position conveyor may grab 818 the cardboard and convey 818 it in a fix-relative-position toward and/or through the next module of the cardboard-handling system. In exemplary embodiment the next module may be the die-rule and counter die, for example. Furthermore, coordination between the cardboard-fix-relative-position conveyor and the next module may occur 818.

Coordination 818 may be performed by a controller, for example. Exemplary coordination may be obtaining information on the path the cardboard has already passed and coordinating 818 the die's drums of the die-rule and counter die such that an encoder will detect 818 that the circumference of each die's drum is in the required position relative to the reference point, for example.

Method 800 may wait till the cardboard is pretreated 820 by the die-rule and counter die. In exemplary embodiment the cardboard-fix-relative-position conveyor may next convey 822 the cardboard toward and/or through the next module. In an exemplary embodiment the next module may be an under-laser raiser, for example. In some exemplary embodiments the vacuum under the under-laser raiser may begin and the belt of the under-laser raiser may be synchronized with the cardboard-fix-relative-position conveyor. The under-laser raiser operation together with the cardboard-fix-relative-position conveyor operation may both be synchronized 824 with the operation of the laser before and/or during and/or after the laser operation on the cardboard.

Method 800 may wait 826 till the laser operation on the cardboard has finished. The detection that the cardboard has been pretreated by the laser may be according to input received that the laser has completed the required pretreated-layout of the cardboard, for example. Method 800 may then proceed to act 828 FIG. 8c. At act 828 a vacuum chamber of a supportive stacker may begin 828. The supportive stacker may grab 828 the cardboard and forward 828 it toward the required place. Next supportive stacker may release 832 the cardboard at the required place. And Method 800 may return to act 812 FIG. 812 to get the next cardboard to be pretreated, for example. In other exemplary embodiments the next cardboard to be grabbed for pre-treatment may be grabbed before the preceding cardboard has finished been pretreated.

Figure 9:
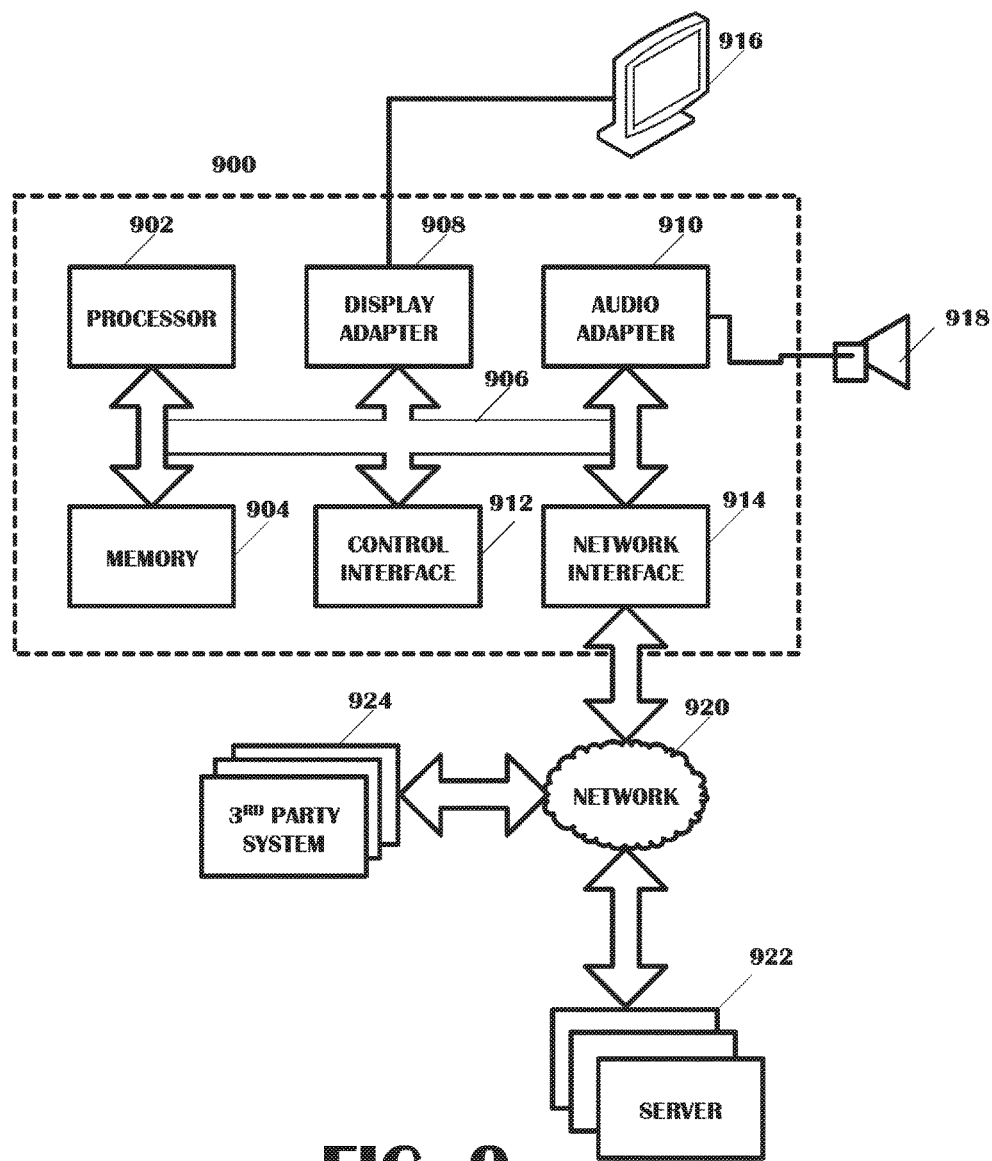
FIG. 9 depicts schematic illustrations of a simplified block diagram with relevant elements of an exemplary embodiment of a controller, according to exemplary teachings of the present disclosure.

FIG. 9 is a functional block diagram of the components of an exemplary embodiment of system or sub-system operating as a controller or processor 900 that could be used in various embodiments of the disclosure for controlling aspects of the various embodiments. It will be appreciated that not all of the components illustrated in FIG. 9 are required in all embodiments of the activity monitor but, each of the components are presented and described in conjunction with FIG. 9 to provide a complete and overall understanding of the components. The controller may include a general computing platform illustrated as including a processor 902 and a memory device 904 that may be integrated with each other or, communicatively connected over a bus or similar interface 906.

The processor 902 can be a variety of processor types including microprocessors, micro-controllers, programmable arrays, custom IC's etc. and may also include single or multiple processors with or without accelerators or the like. The memory element of 904 may include a variety of structures, including but not limited to RAM, ROM, magnetic media, optical media, bubble memory, FLASH memory, EPROM, EEPROM, etc. The processor 902 or other components in the controller may also provide components such as a real-time clock, analog to digital convertors, digital to analog convertors, etc.

The processor 902 may also interfaces to a variety of elements including a control interface 912, a display adapter 908, an audio adapter 910, and network/device interface 914. The control interface 912 provides an interface to external controls. External controls such as but not limited to: sensors; actuators; drums; step motors; a keyboard, a computer mouse; an audio activated device, as well as a variety of the many other available input and output devices or, another computer or processing device or the like. The display adapter 908 can be used to drive a variety of alert elements 916, such as display devices including an LED display, LCD display, one or more LEDs or other display devices.

The audio adapter 910 interfaces to and drives another alert element 918, such as a speaker or speaker system, buzzer, bell, etc. The network/interface 914 may interface to a network 920 which may be any type of network including, but not limited to the Internet, a global network, a wide area network, a local area network, a wired network, a wireless network or any other network type including hybrids. Through the network 920, or even directly, the controller 900 can interface to other devices or computing platforms such as one or more servers 922 and/or third party systems 924. A battery or power source provides power for the controller 900.

In the description and claims of the present disclosure, each of the verbs, "comprise", "include" and "have", and conjugates thereof, are used to indicate that the object or objects of the verb are not necessarily a complete listing of members, components, elements, or parts of the subject or subjects of the verb and further, all of the listed objects are not necessarily required in all embodiments.

As used herein, the singular form "a", "an" and "the" include plural references unless the context clearly dictates otherwise. For example, the term "a material" or "at least one material" may include a plurality of materials, including mixtures thereof.

In this disclosure the words "unit", "element", "device", and/or "module" are used interchangeably. Anything designated as a unit, element, device and/or module may be a stand-alone unit or a specialized module. A unit, element, and/or module may be modular or have modular aspects allowing it to be easily removed and replaced with another similar unit, element, device, and/or module. Each unit, element, device, and/or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present disclosure has been described using detailed descriptions of embodiments thereof that are provided by way of example and are not intended to limit the scope of the disclosure. The described embodiments comprise different features, not all of which are required in all embodiments of the disclosure. Some embodiments of the present disclosure utilize only some of the features or possible combinations of the features. Many other ramifications and variations are possible within the teaching of the embodiments comprising different combinations of features noted in the described embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention.

It will be appreciated by persons skilled in the art that the present disclosure is not limited by what has been particularly shown and described herein above. Rather the scope of the invention is defined by the claims that follow.

What is claimed is:

1. A cardboard-handling system comprising:
   a controller;
   a rule-die associated to a first drum and a counter die associated to a second drum;
   a cardboard-alignmentor on a first side of the rule-die and counter-die;
   a synchronized-cardboard transferors; and
   a cardboard-fix-relative-position conveyor;
   wherein the cardboard-alignmentor aligns and conveys a cardboard together with one or more synchronized-cardboard transferors toward the cardboard-fix-relative-position conveyor that transfers the cardboard toward and through a junction between the rule-die and the counter die to a second side of the rule-die and counter-die, and the controller synchronizes the movement of the cardboard along the cardboard-handling system.

2. The cardboard-handling system of claim 1, further comprising:
   a laser-treatment module on the second side of the rule-die and counter-die comprising:
   a laser;
   an under-laser raiser comprising a base with a plurality of protruding elements; and
   a coupling mechanism;
   wherein the coupling mechanism couples one or more cardboards, conveyed by the cardboard-fix-relative-position conveyor from the second side of the rule-die and counter-die, to a top surface of one or more of the protruding elements and the laser produces a beam to pre-treat the cardboard, and wherein the cardboard-fix-relative-position conveyor movement of cardboard is synchronized with the laser-treatment module operation.

3. The cardboard-handling system of claim 2, wherein the coupling mechanism comprise: openings in the base and a suction mechanism substantially beneath the base.

4. The cardboard-handling system of claim 2, wherein the base with a plurality of protruding elements has moving capabilities and is synchronized with the cardboard-fix-relative-position conveyor.

5. The cardboard-handling system of claim 4, wherein the synchronization is via a timing belt.

6. The cardboard-handling system of claim 2, wherein pre-treating the cardboard is cutting the cardboard.

7. The cardboard-handling system of claim 1, further comprising a supportive stacker that comprises:
   a conveyor comprising a plurality of openings;
   a dynamic-size holder comprising:
     a plurality of openings at a portion of the dynamic-size holder's surface;
     a vacuum chamber; and
     a piston mechanism;
   wherein the conveyor is associated to the dynamic-size holder's surface; and
   wherein the piston mechanism is adjusted along the dynamic-size holder according to parameters of a cardboard that was obtained from the cardboard-handling system's module preceding the supportive stacker, to reveal at least some of the openings at the portion of the dynamic-size holder's surface to a vacuum by the vacuum chamber that couples the cardboard to at least some of the openings of the conveyor, whereby the cardboard is moved from the cardboard-handling system's module preceding place to a stack.

8. The cardboard-handling system of claim 7, wherein the cardboard-handling system's module preceding the supportive stacker is a laser-treatment module.

9. The cardboard-handling system of claim 1, wherein the cardboard-alignmentor comprises:
   a plane;
   an alignment bar associated to the plane; and
   an alignment conveyor associated to the plane placed in a diagonal-like direction in relation to the alignment bar;
wherein the alignment conveyor conveys a cardboard toward and along the alignment bar, and wherein the aligned cardboard is then transferred toward the cardboard-fix-relative-position conveyor.

10. The cardboard-handling system of claim 1, wherein the synchronized-cardboard transferors comprises: a plurality of cardboard transferors that comprise one or more cardboard leading mechanism and one or more transferor, and wherein the synchronized-cardboard transferors transfer the cardboard between two or more modules of the cardboard-handling system according to the controller command.

11. The cardboard-handling system of claim 10, wherein the cardboard leading mechanism comprise one or more pinch rollers and wherein the transferor comprise one or more nip rollers, and a relative angle of the pinch rollers in relation to the nip rollers define a cardboards moving direction.

12. The cardboard-handling system of claim 1, wherein the cardboard-fix-cross-position conveyor is a side gripper.

13. The cardboard-handling system of claim 12, wherein the side gripper comprise a cross-limit-guarder.

14. The cardboard-handling system of claim 1, the controller is associated to one or more servo motors and one or more sensors that synchronize one or more modules of the cardboard-handling system.

15. The cardboard-handling system of claim 1, wherein the controller gets information on at least one of the die drums circumference position in relation to a reference point and sends commands to control the position of at least one of the die's circumference in relation to a reference point.

16. A cardboard-handling system comprising:
   a controller;
   a rule-die associated to a first drum and a counter die associated to a second drum;
   a cardboard-alignmentor on a first side of the rule-die and counter-die;
   a synchronized-cardboard transferor; and
   a cardboard-fix-relative-position conveyor;
wherein the cardboard-alignmentor aligns and conveys a cardboard together with one or more synchronized-cardboard transferors toward the cardboard-fix relative-position conveyor that transfers the cardboard toward and through a junction between the rule-die and the counter die to a second side of the rule-die and counter-die, and the controller synchronizes the movement of the cardboard along the cardboard-handling system;
   the cardboard-handling system further comprising a supportive stacker that comprises:
   a conveyor comprising a plurality of openings;
   a dynamic-size holder comprising:
      a plurality of openings at a portion of the dynamic-size holder's surface;
      a vacuum chamber; and
      a piston mechanism;
wherein the conveyor is associated to the dynamic-size holder's surface; and
wherein the piston mechanism is adjusted along the dynamic-size holder according to parameters of a cardboard that was obtained from the cardboard-handling system's module preceding the supportive stacker, to reveal at least some of the openings at the portion of the dynamic-size holder's surface to a vacuum by the vacuum chamber that couples the cardboard to at least some of the openings of the conveyor, whereby the cardboard is moved from the cardboard-handling system's module preceding place to a stack.

17. The cardboard-handling system of claim 16, further comprising:
   a laser-treatment module on the second side of the rule-die and counter-die comprising:
      a laser;
      an under-laser raiser comprising a base with a plurality of protruding elements; and
      a coupling mechanism;
wherein the coupling mechanism couples one or more cardboards, conveyed by the cardboard-fix-relative-position conveyor from the second side of the rule-die and counter-die, to a top surface of one or more of the protruding elements and the laser produces a beam to pre-treat the cardboard, and wherein the cardboard-fix-relative-position conveyor movement of cardboard is synchronized with the laser-treatment module operation.

18. The cardboard-handling system of claim 17, wherein the coupling mechanism comprise: openings in the base and a suction mechanism substantially beneath the base.

19. The cardboard-handling system of claim 17, wherein the base with a plurality of protruding elements has moving capabilities and is synchronized with the cardboard-fix-relative-position conveyor.

20. The cardboard-handling system of claim 19, wherein the synchronization is via a timing belt.

* * * * *